US012568510B2

(12) United States Patent
Park et al.

(10) Patent No.: US 12,568,510 B2
(45) Date of Patent: Mar. 3, 2026

(54) METHOD AND DEVICE FOR MANAGING MULTIPLE TCI STATES PER CORESET IN WIRELESS COMMUNICATION SYSTEM

(71) Applicant: Samsung Electronics Co., Ltd., Gyeonggi-do (KR)

(72) Inventors: Kyoungmin Park, Gyeonggi-do (KR); Seongmok Lim, Gyeonggi-do (KR); Youngrok Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 419 days.

(21) Appl. No.: 18/118,374

(22) Filed: Mar. 7, 2023

(65) Prior Publication Data

US 2023/0292340 A1    Sep. 14, 2023

(30) Foreign Application Priority Data

Mar. 8, 2022    (KR) ......................... 10-2022-0029524

(51) Int. Cl.
*H04W 72/232*        (2023.01)
*H04L 5/00*          (2006.01)
(52) U.S. Cl.
CPC .......... *H04W 72/232* (2023.01); *H04L 5/0053* (2013.01); *H04L 5/0091* (2013.01)
(58) Field of Classification Search
CPC ... H04L 5/0091; H04L 5/0053; H04W 72/232
USPC ....................................................... 370/329
See application file for complete search history.

(56) References Cited

U.S. PATENT DOCUMENTS

| | | | | |
|---|---|---|---|---|
| 12,108,426 B2 * | 10/2024 | Kim | ..................... | H04W 72/046 |
| 2021/0135741 A1 * | 5/2021 | Zhou | ..................... | H04B 7/0404 |
| 2021/0345342 A1 * | 11/2021 | Sakhnini | .............. | H04B 7/0695 |
| 2021/0360602 A1 | 11/2021 | Zhou et al. | | |
| 2021/0385807 A1 | 12/2021 | Rahman et al. | | |
| 2022/0303910 A1 * | 9/2022 | Zhang | ................. | H04W 52/146 |
| 2023/0012726 A1 * | 1/2023 | Karjalainen | .......... | H04W 16/14 |
| 2023/0198721 A1 * | 6/2023 | Gao | ...................... | H04L 5/0082 |
| | | | | 370/329 |

FOREIGN PATENT DOCUMENTS

| | | | | |
|---|---|---|---|---|
| EP | 3823220 A1 * | 5/2021 | ........... | H04W 72/23 |
| EP | 3934122 A1 * | 1/2022 | ........... | H04W 72/20 |

(Continued)

OTHER PUBLICATIONS

International Search Report dated May 26, 2023 issued in counterpart application No. PCT/KR2023/003082, 7 pages.

*Primary Examiner* — Peter G Solinsky
(74) *Attorney, Agent, or Firm* — The Farrell Law Firm, P.C.

(57)    ABSTRACT
The disclosure relates to a 5G or 6G communication system for supporting a higher data transmission rate. A method performed by a terminal in a wireless communication system is provided. The method includes receiving, from a base station, downlink control information (DCI) associated with a control resource set (CORESET), the DCI indicating one or more transmission configuration indicator (TCT) states; updating at least one of a plurality of TCI states based on the one or more TCT states indicated by the DCI; and applying the one or more TCI states to at least one of a downlink reception or an uplink transmission associated with the CORESET.

20 Claims, 19 Drawing Sheets

- Beam information used for PDCCH reception
- When there is no other TCI state, PDSCH/PUSCH beam information scheduled by PDCCH received through corresponding CORESET
- PDSCH/PUSCH beam information scheduled by PDCCH received through corresponding CORESET

(56) References Cited

FOREIGN PATENT DOCUMENTS

| EP | 3952554 A1 * | 2/2022 | ............ H04W 72/23 |
|----|----|----|----|
| EP | 4297289 A2 * | 12/2023 | ........... H04L 5/0053 |
| WO | WO-2020144626 A1 * | 7/2020 | ............ H04W 72/23 |
| WO | 2021/205409 | 10/2021 | |
| WO | 2021/212456 | 10/2021 | |
| WO | WO-2021222397 A1 * | 11/2021 | ............ H04W 72/23 |
| WO | 2022/021426 | 2/2022 | |
| WO | WO-2022021426 A1 * | 2/2022 | ........... H04B 7/0695 |

* cited by examiner

FIG. 2 duration (5-04)

Frequecy resources (5-03)

UE bandwidth part (5-10)

Slot (5-20)

Control resource set#1 (5-01)

Control resource set#2 (5-02)

Time

Frequency

| Transceiver | Controller | Storage |

METHOD AND DEVICE FOR MANAGING MULTIPLE TCI STATES PER CORESET IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0029524, which was filed in the Korean Intellectual Property Office on Mar. 8, 2022, the entire disclosure of which is herein incorporated by reference.

BACKGROUND

1. Field

The disclosure relates generally to a method and device for controlling a beam in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In a 5G system, the support for more services is being considered as compared to the existing 4G system. For example, common services may include eMBB, URLLC, mMTC, evolved multimedia broadcast/multicast service (eMBMS), etc. A system providing the URLLC service may be referred to as a URLLC system, and a system providing the eMBB service may be referred to as an eMBB system. Further, the terms "service" and "system" may be used interchangeably herein.

A URLLC service is newly considered in the 5G system, unlike the existing 4G system, and requires ultra-high reliability (e.g., a packet error rate of about 10-5) and low latency (e.g., about 0.5 msec) requirements compared to other services. In order to satisfy these strict requirements, the URLLC service may apply a shorter transmission time interval (TTI) than the eMBB service, and various operating methods using a shorter TTI are being considered.

As a common technique that may satisfy the conflicting requirements of a URLLC service requiring high reliability and an eMBB service requiring a high transmission rate, a multiple (M)-transmission and reception point (TRP) in which a terminal performs communication through multiple transmission and reception nodes has been standardized through 3rd generation partnership project (3GPP) Rel-16. Subsequently, a method of applying the technology to various channels such as a physical downlink (DL) control channel (PDCCH), a physical DL shared channel (PDSCH), a physical uplink (UL) control channel (PUCCH), and a physical UL shared channel (PUSCH) through Rel-17 has been proposed. The M-TRP technique may be divided into two types of DL control information (DCI): 1) single-DCI (S-DCI) that controls transmission and reception through a plurality of nodes through one control information, and 2) multiple-DCI (M-DCI) that separately transmits information on each node. The S-DCI technique is appropriate for implementing in a network with a relatively simple structure in which only one node among a plurality of nodes performs a terminal control, and is also appropriate for using in base stations and cells responsible for communication in a small area. However, it is expected that the M-DCI technique used in a situation in which a plurality of nodes perform a terminal control will be mainly in a network that provides communication in a relatively wide area and that has a long distance between nodes.

As a terminal communication technique corresponding to the multi-transmission and reception node communication technique, standardization of the multi-panel-based communication technique has been partially progressed, and additional standardization is expected to proceed in the future. In the multi-panel-based communication technique, a terminal performs communication through a plurality of antenna arrays capable of independent operation. In this case, the total transmission power is increased or communication through a better beam is possible through independent operation and cooperative operation between each array.

SUMMARY

An aspect of the disclosure is to provide a method for a base station or a TRP to perform a common beam-based beam control for a terminal operating in a multi-TRP operation mode and an operation of the terminal. An existing common beam-based beam control technique may not perform beam control when multiple TRPs and terminals are connected, and beam conversion is performed through beam update based on transmission and reception of an acknowledgment (ACK) signal. Thus, there is a disadvantage that a large delay for the beam control may occur.

Another aspect of the disclosure is to provide a common beam-based beam control technique applicable to both S-DCI and M-DCI techniques in which one TRP or multiple TRPs perform PDCCH transmission, and to provide a beam control technique and an M TRP operation technique in which beam conversion or TRP conversion is performed at a higher speeds than in the existing common beam-based beam control technique.

In accordance with an aspect of the disclosure, a method is provided for a terminal in a wireless communication system. The method includes receiving, from a base station, DCI associated with a control resource set (CORESET), the DCI indicating one or more transmission configuration indicator (TCI) states; updating at least one of a plurality of TCI states based on the one or more TCT states indicated by the DCI; and applying the one or more TCI states to at least one of a DL reception or a UL transmission associated with the CORESET.

In accordance with another aspect of the disclosure, a method is provided for a base station in a wireless communication system. The method includes transmitting, to a terminal, DCI associated with a CORESET, the DCI indicating one or more TCI states, wherein at least one of a plurality of TCI states for the terminal is updated based on the one or more TCI states indicated by the DCI; and applying the one or more TCI states to at least one of a DL transmission or a UL reception associated with the CORESET.

In accordance with another aspect of the disclosure, a terminal is provided for use in a wireless communication system. The terminal includes a transceiver and a controller. The controller is configured to receive, from a base station, via the transceiver, DCI associated with a CORESET, the DCI indicating one or more TCI states, update at least one of a plurality of TCI states based on the one or more TCI states indicated by the DCI, and apply the one or more TCI states to at least one of a DL reception or a UL transmission associated with the CORESET.

In accordance with another aspect of the disclosure, a base station is provided for use in a wireless communication system. The base station includes a transceiver and a controller. The controller is configured to transmit, to a terminal, via the transceiver, DCI associated with a CORESET, the DCI indicating one or more TCI states, wherein at least one of a plurality of TCI states for the terminal is updated based on the one or more TCI states indicated by the DCI, and apply the one or more TCI states to at least one of a DL transmission or a UL reception associated with the CORESET.

Technical problems to be achieved in the disclosure are not limited to the technical problems mentioned above, and other technical problems not mentioned will be clearly understood by those of ordinary skill in the art to which the disclosure belongs from the description below.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a frame, a subframe, and a slot structure in a 5G system;

FIG. 10 illustrates two TCI state values being indicated for an m-TRP operation according to an embodiment;

DETAILED DESCRIPTION

Figure 1:
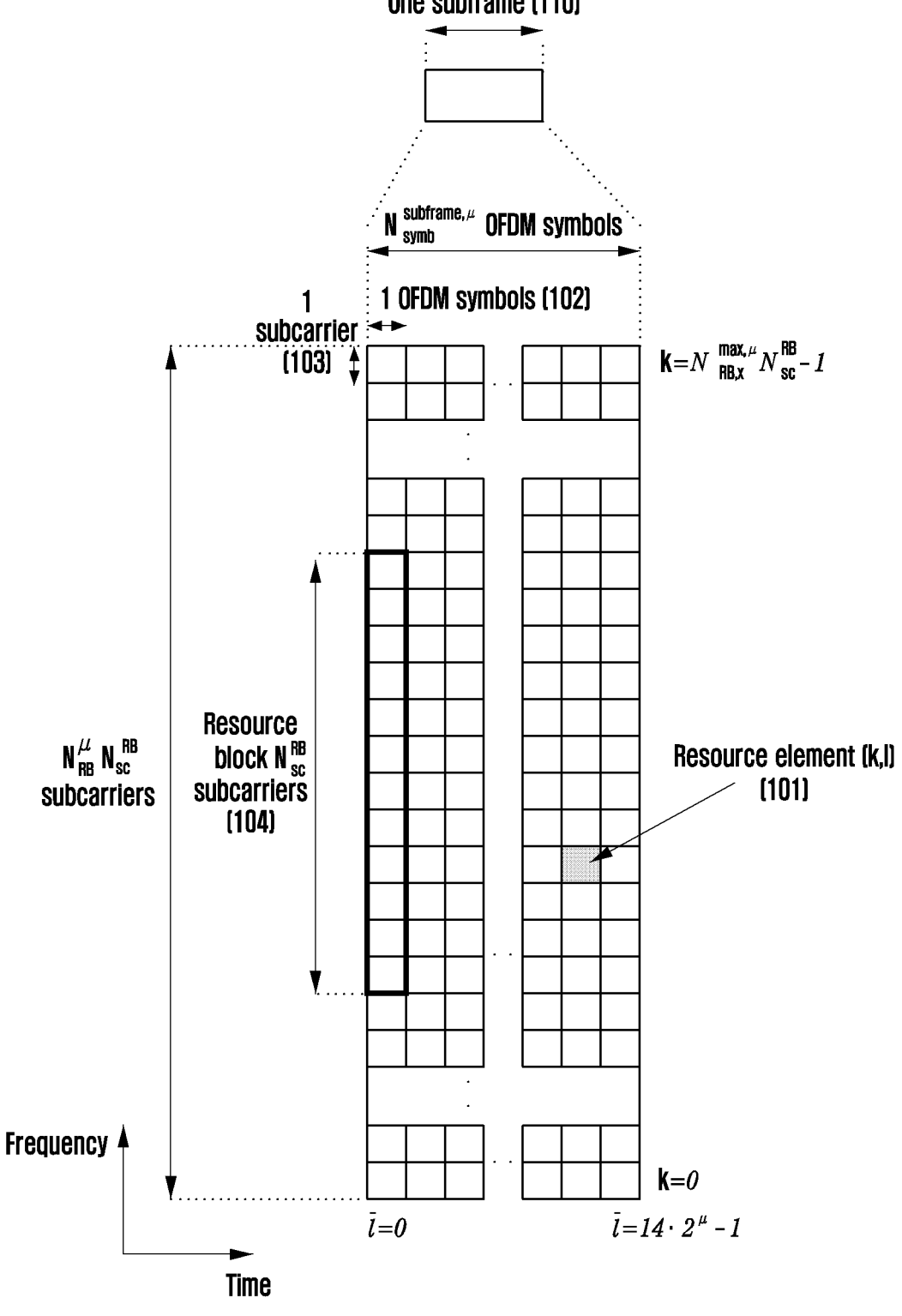
FIG. 1 illustrates a time-frequency domain in which data or control channels are transmitted in a wireless communication system.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Singular forms "a," "an," and "the" include plural referents unless the context clearly dictates otherwise. Thus, for example, reference to "a component surface" includes reference to one or more of such surfaces.

The term "substantially" indicates that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words like "unit", "module", etc., may refer to a software component or hardware component, e.g., a field-programmable gate array (FPGA) or an application-specific integrated circuit (ASIC) capable of carrying out a function or an operation. However, a "unit", or the like, is not limited to hardware or software. For example, a unit may be configured to reside in an addressable storage medium or to drive one or more processors. Units may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Generally, a base station is an entity communicating with a UE and may also be referred to as a base transceiver station (BTS), a node B (NB), an evolved NB (eNB), an access point (AP), a 5G NB (5GNB), or a gNB.

A UE is an entity communicating with a base station and may also be referred to as a device, a mobile station (MS), a mobile equipment (ME), or a terminal.

FIG. 1 illustrates a time-frequency domain in which data or control channels are transmitted in a wireless communication system.

Referring to FIG. 1, a horizontal axis represents a time domain and a vertical axis represents a frequency domain. A basic unit of resources in the time and frequency domains is a resource element (RE) 1-01 and may be defined to an orthogonal frequency division multiplexing (OFDM) symbol 1-02 in the time axis and a subcarrier 1-03 in the frequency axis. In the frequency domain, the $N_{SC}^{RB}$ (e.g., 12) number of consecutive REs may constitute a resource block (RB) 1-04.

Figure 2:
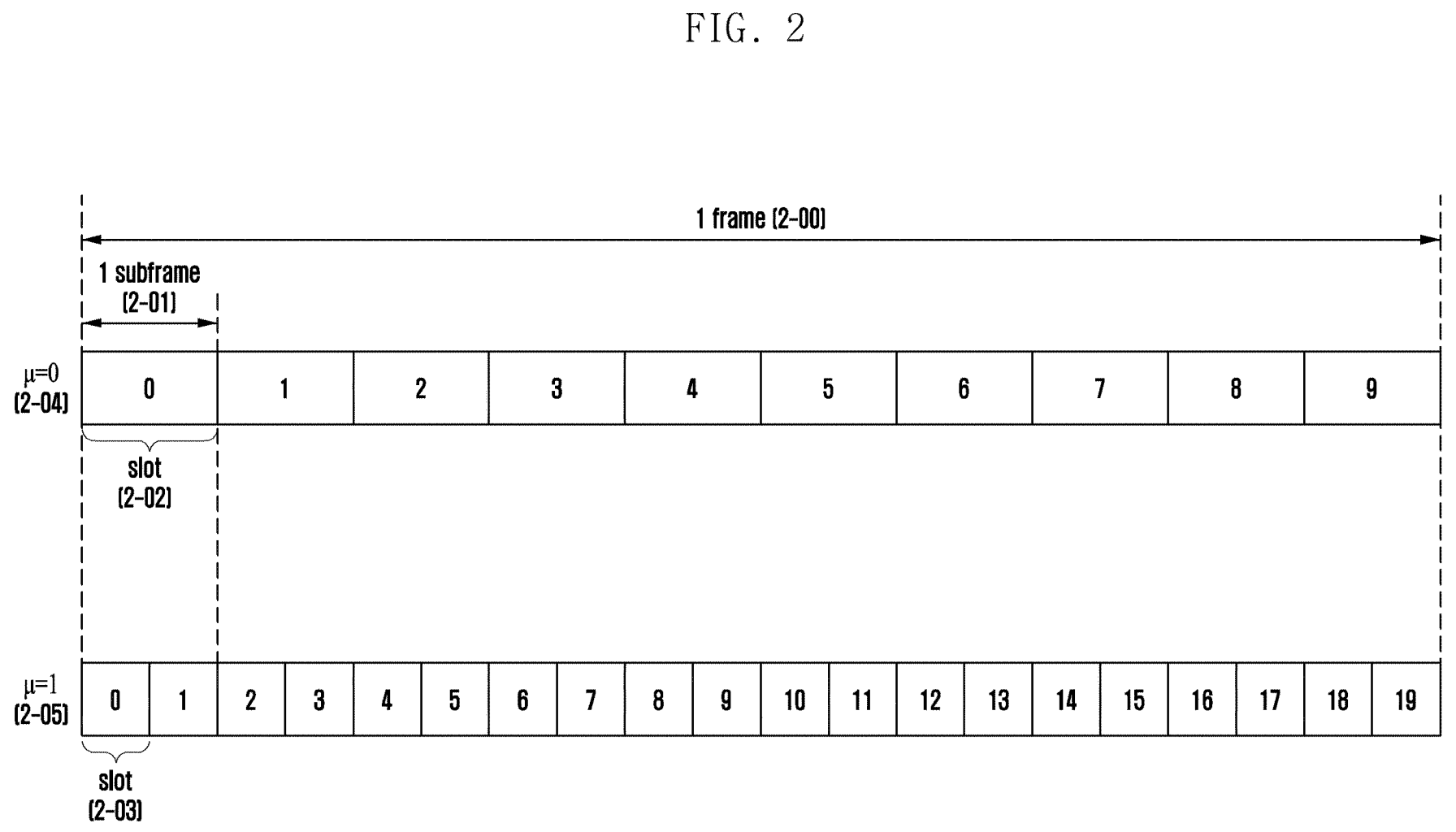

FIG. 2 illustrates a frame, a subframe, and a slot structure in a 5G system.

Referring to FIG. 2, a frame 2-00, a subframe 2-01, and a slot 2-02 are illustrated. The frame 2-00 may be defined as 10 ms. The subframe 2-01 may be defined as 1 ms, and the frame 2-00 may composed of total 10 subframes 2-01. The slots 2-02 and 2-03 may be defined to 14 OFDM symbols (i.e., the number ($N_{symb}^{slot}$=14) of symbols per slot), The subframe 2-01 may composed of one or a plurality of slots 2-02 and 2-03, and the number of slots 2-02 and 2-03 per subframe 2-01 may vary according to the configuration value μ 2-04 and 2-05 for subcarrier spacing.

In the example of FIG. 2, μ=0 (2-04) and μ=1 (2-05) are illustrated as subcarrier spacing configuration values. When μ=0 (2-04), the subframe 2-01 may composed of the slot 2-02, and when μ=1 (2-05), the subframe 2-01 may be composed of two slots 2-03. That is, the number $N_{slot}^{subframe,\mu}$ of slots per subframe may vary according to the configuration value μ for the subcarrier spacing, and accordingly, the number $N_{slot}^{frame,\mu}$ of slots per frame may vary. $N_{slot}^{subframe,\mu}$ and $N_{slot}^{frame,\mu}$ according to each subcarrier spacing configuration μ may be defined, as shown Table 1 below.

TABLE 1

| M | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell nay be composed of 250 or more RBs. Therefore, if the UE always receives the entire serving cell bandwidth, as in long term evolution (LTE), power consumption of the UE may be extreme. In order to solve this problem, the base station may configure one or more BWPs to the UE in order for the UE to change a reception area within the cell.

In NR, the base station may configure an initial BWP, which is a bandwidth of a CORESET #0 (or common search space (CSS)) to the UE through a master information block (MIB). Thereafter, the base station may configure first BWP of the UE through radio resource control (RRC) signaling and notify at least one BWP configuration information that may be indicated through future DCI. Thereafter, the base station may notify a BWP identifier (ID) through DCI to indicate which band the UE will use. If the UE does not receive DCI from the currently allocated BWP for more than a specific time, the UE returns to a default BWP and attempts to receive DCI.

Figure 3:
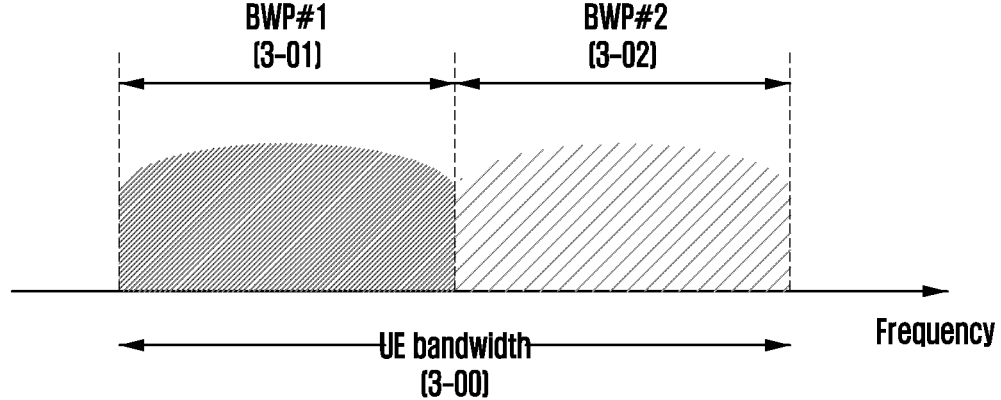
FIG. 3 illustrates a BWP configuration in a wireless communication system according to an embodiment.

FIG. 3 illustrates a BWP configuration according to an embodiment.

Referring to FIG. 3, a UE bandwidth 3-00 includes two MVPs, i.e., a BWP #1 3-05 and a BWP #2 3-10. The base station may configure one or a plurality of BWPs to the UE and configure information such as shown in Table 2 for each BWP.

TABLE 2

| | |
|---|---|
| Configuration information 1 | Bandwidth of the BWP (number of physical RBs (PRBs) constituting the BWP) |
| Configuration information 2 | Frequency position of the BWP (as this information, there may be an offset value compared to a reference point, which may include a center frequency of a carrier wave, a synchronization signal (SS), SS raster, etc.) |
| Configuration information 3 Etc. | Numerology of the BWP (e.g., subcarrier spacing, cyclic prefix (CP) length, etc.) |

In addition to the configuration information as in Table 2, various parameters related to the BWP may be configured to the UE. The above-described information may be transmitted from the base station to the UE through higher layer signaling, e.g., RRC signaling. At least one BWP among configured one or a plurality of configured BWPs may be activated. Whether the configured MVP is activated may be semi-statically transmitted from the base station to the UE through RRC signaling or may be dynamically transmitted through a media access control (MAC) control element (CE) or DCI.

A configuration of the BWP supported in the above-described 5G communication, system may be used for various purposes.

For example, if the bandwidth supported by the UE is smaller than the system bandwidth, the bandwidth supported by the UE may be supported through a configuration of the BWP. By configuring a frequency position (configuration information 2) of the BWP as shown in Table 2 to the UE, the UE may transmit and receive data at a specific frequency position within the system bandwidth.

As another example, to support different numerologies, the base station may configure a plurally of BWPs to the UE. For example, in order to support both data transmission and reception using subcarrier spacing of 1.5 kHz and subcarrier spacing of 30 kHz to and from an arbitrary UE, two BWPs may be configured to use subcarrier spacing of 15 kHz and 30 kHz, respectively. Different BWPs may be frequency division multiplexed (FDMed), and if data is to be transmitted and received at specific subcarrier spacing, a BWP configured at corresponding subcarrier spacing may be activated.

As another example, to reduce power consumption of the UE, the base station may configure BWPs having different sizes of bandwidths to the UE. For example, if the UE supports a very large bandwidth, e.g., a bandwidth of 100 MHz, and always transmits and receives data with the corresponding bandwidth, very large power consumption may be caused. In particular, it is very inefficient in terms of power consumption for the UE to monitor an unnecessary DL control channel for a large bandwidth of 100 MHz when there is no traffic. Therefore, to reduce power consumption of the UE, the base station may configure a relatively small BWP, e.g., a MVP of 20 MHz, to the UE. When there is no traffic, the UE may perform a monitoring operation in the BWP of 20 MHz, and if data is generated, the UE may transmit and receive data using a BWP of 100 MHz according to the indication of the base station.

Figure 4:
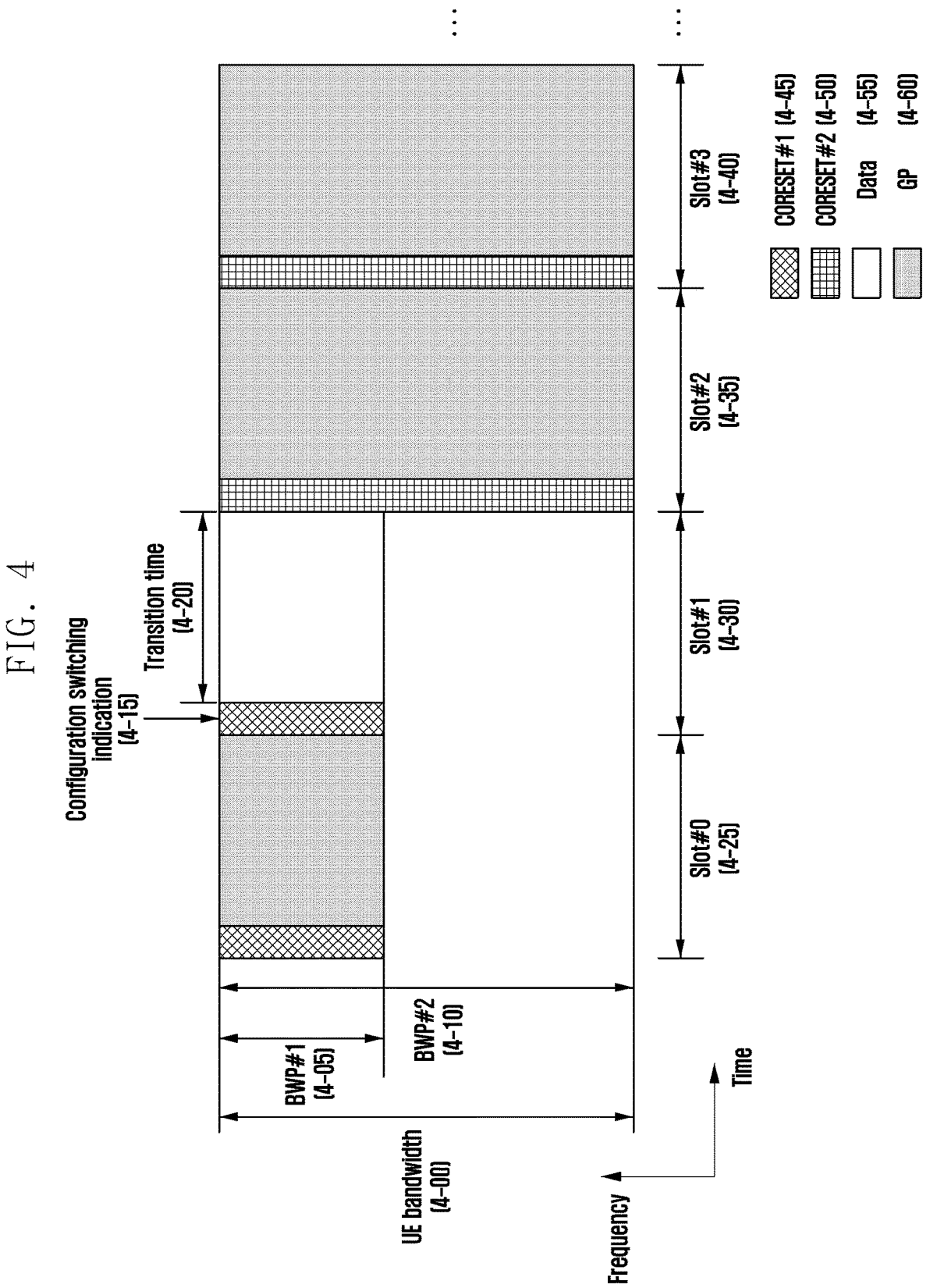
FIG. 4 illustrates a dynamic configuration change method for a BWP according to an embodiment of the disclosure.

FIG. 4 illustrates a dynamic configuration change method for a BWP according, to an embodiment.

Referring to FIG. 4, as described above with reference to Table 2, the base station may configure one or a plurality of BWPs to the UE, and notify the UE of a bandwidth of the BWP, a frequency position of the BWP, and information on numerology of the BWP as a configuration for each BWP.

As illustrated in FIG. 4, two MVPs, i.e., a BPW #1 4-05 and a BWP #2 4-10 within a UE bandwidth 4-00 may be configured to the UE. One or multiple BWPs may be activated among the configured bandwidths. In FIG. 4, an example in which one BWP is activated may be considered. In a slot #0 4-25, the BPW #1 4-05 among the configured BWPs is activated, and the UE may monitor a PDCCH in a CORESET #1 4-45 configured to the BPW #1 4-05, and transmit and receive data 4-55 in the BPW #1 4-05. According to which BWP is activated among the configured BWPs, the CORESET in which the UE receives the PDCCH may be different, and accordingly, the bandwidth in which the UE monitors the PDCCH may be different.

The base station may additionally transmit an indicator for changing a configuration for the BWP to the UE. Here, changing the configuration for the BWP may be regarded as an operation of activating a specific BWP (e.g., changing activation from a BWP A to a BWP B). The base station may transmit a configuration switching indicator to the UE in a specific slot. After receiving the configuration switching indication from the base station, the UE may apply the changed configuration according to the configuration switching indication from a specific time point to determine a BWP to be activated. Further, the UE may perform monitoring for the PDCCH in the CORESET configured to the activated BWP.

In FIG. 4, the base station may transmit a configuration switching indication 4-15 indicating the UE to change the activated BWP from the existing BPW #1 4-05, to the BPW #2 4-10, in a slot #1 4-30. After receiving the corresponding indicator, the UE may activate the BPW #2 4-10 according to the contents of the indicator. In this case, a transition time 4-20 for changing the BWP may be required, and accordingly, a time point for changing and applying the activated BWP may be determined. FIG. 4 illustrates a transition time 4-20 of 1 slot being required after receiving the configuration switching indication 4-15. Data transmission and reception may not be performed during the transition time 4-20 (4-60). Accordingly, the BPW #2 4-10 may be activated in a slot #2 4-35, and as such, control channels and data may be transmitted and received through the corresponding BWP.

The base station may preconfigure one or more BWPs to the UE through higher layer signaling (e.g., RRC signaling), and the configuration switching indication 4-15 may indicate to activate by a method of mapping one of BWP configurations preconfigured by the base station. For example, the indicator of log2N bits may select and indicate one of the N number of preconfigured BWPs.

Table 3 represents an example of indicating configuration information for a BWP using, a 2-bit indicator.

TABLE 3

| Indicator value | BWP configuration |
|---|---|
| 00 | Bandwidth configuration A configured by higher layer signaling |
| 01 | Bandwidth configuration B configured by higher layer signaling |
| 10 | Bandwidth configuration C configured by higher layer signaling |
| 11 | Bandwidth configuration D configured by higher layer signaling |

The configuration switching indication 4-15 for the BWP described in FIG. 4 may be transmitted from the base station to the UE in the form of MAC CE signaling or layer 1 (L1) signaling (e.g., common DCI, group-common DCI and UE-specific DCI).

According to the configuration switching indication 4-15 for the BWP described in FIG. 4, whether the BWP activation is to be applied from any time point may follow the following. Whether the configuration change is to be applied from any time point may follow a predefined value (e.g., applied from N (≥1) slots after receiving the configuration switching indication), may be configured from the base station to the UE through higher layer signaling (e.g., RRC signaling), or may be partially included in the contents of the configuration switching indication 4-15 and transmitted. Alternatively, a time point at which the configuration change is applied may be determined by a combination of the above methods. After receiving the configuration switching indication 4-15 for the BWP, the UE may apply the changed configuration from the time point obtained in the above-described method.

Scheduling information on UL data (or a PUSCH) or DL data (or a PDSCH) in the 5G system is transmitted from the base station to the UE through DCI. The UE may monitor a DCI format for fallback and a DCI format for non-fallback with respect to the PUSCH or PDSCH. The DCI format for fallback may include a fixed field predefined between the base station and the UE, and the DCI format for non-fallback may include a configurable field.

The DCI may be transmitted through a PDCCH via channel coding and modulation processes. A cyclic redundancy check (CRC) is attached to a DCI message payload, and the CRC is scrambled with a radio network temporary identifier (RNTI) corresponding to the identity of the UE. Different RNTIs are used according to the purpose of the DCI message, e.g., UE-specific data transmission, power control command, or random access response (RAR). That is, the RNTI is not explicitly transmitted but is included in a CRC calculation process and transmitted.

Upon receiving the DCI message transmitted on the PDCCH, the UE may identify the CRC using the allocated RNTI, and if the CRC identification result is correct, the UE may know that the corresponding message has been transmitted to the UE.

For example, DCI scheduling a PDSCH for system information (SI) may be scrambled with an SI-RNTI. DCI scheduling a PDSCH for an RAR message may be scrambled with a random access RNTI (RA-RNTI). DCI scheduling a PDSCH for a paging message may be scrambled with a paging RNTI (P-RNTI). DCI notifying a slot format indicator (SFI) may be scrambled with an SFI-RNTI. DCI notifying transmit power control (TPC) may be scrambled with a TPC-RNTI. DCI scheduling a UE-specific PDSCH or PUSCH may be scrambled with a cell RNTI (C-RNTI).

A DCI format 0_0 may be used as fallback DCI for scheduling a PUSCH, and in this case, a CRC may be scrambled with a C-RNTI. The DCI format 0_0 in which a CRC is scrambled with a C-RNTI may include, e.g., information as shown in Table 4 below.

TABLE 4

Identifier for DCI formats - 1 bit
Frequency domain resource assignment - $[\lceil \log_2(N_{RB}^{UL,BWP} (N_{RB}^{UL,BWP} + 1)/2 \rceil]$ bits
Time domain resource assignment - X bits
Frequency hopping flag - 1 bit.
Modulation and coding scheme (MCS) - 5 bits
New data indicator (NDI) - 1 bit
Redundancy version (RV) - 2 bits
Hybrid automatic repeat request (HARQ) process number - 4 bits
TPC command for scheduled PUSCH - 2 bits
UL/supplementary UL (SUL) indicator - 0 or 1 bit A DCI format 0_1 may be used as non-fallback DCI for scheduling a PUSCH, and in this case, a CRC may be scrambled with a C-RNTI. The DCI format 0_1 in which a CRC is scrambled with a C-RNTI may include, e.g., information as shown in Table 5 below.

TABLE 5

Carrier indicator - 0 or 3 bits
UL/SUL indicator - 0 or 1 bit
Identifier for DCI formats - 1 bit
BWP indicator - 0, 1 or 2 bits

TABLE 5-continued

Frequency domain resource assignment
  For resource allocation type 0, $\lceil N_{RB}^{UL, BWP} / P \rceil$ bits
  For resource allocation type 1, $\lceil \log_2(N_{RB}^{UL, BWP}(N_{RB}^{UL, BWP} + 1)/2 \rceil$
bits
  Time domain resource assignment -1, 2, 3, or 4 bits
  Virtual RB (VRB)-to-PRB mapping - 0 or 1 bit, only for resource
allocation type 1.
  0 bit if only resource allocation type 0 is configured;
  1 bit otherwise.
  Frequency hopping flag - 0 or 1 bit, only for resource allocation type 1.
  0 bit if only resource allocation type 0 is configured;
  1 bit otherwise.
  MCS - 5 bits
  NDI - 1 bit
  RV - 2 bits
  HARQ process number - 4 bits
  1st DL assignment index - 1 or 2 bits
  1 bit for semi-static HARQ-ACK codebook;
  2 bits for dynamic HARQ-ACK codebook with single HARQ-ACK
codebook.
  2nd DL assignment index - 0 or 2 bits
  2 bits for dynamic HARQ-ACK codebook with two HARQ-ACK
sub-codebooks;
  0 bit otherwise.
  TPC command for scheduled PUSCH - 2 bits SRS resource indicator $- \left\lceil \log_2 \left( \sum_{k=1}^{L_{max}} \binom{N_{SRS}}{k} \right) \right\rceil$ or $\lceil \log_2(N_{SRS}) \rceil$ bits $\left\lceil \log_2 \left( \sum_{k=1}^{L_{max}} \binom{N_{SRS}}{k} \right) \right\rceil$ bits for non−codebook based PUSCH transmission;
  $\lceil \log_2(N_{SRS}) \rceil$ bits bits for codebook based PUSCH transmission.
  Precoding information and number of layers -up to 6 bits
  Antenna ports - up to 5 bits
  SRS request - 2 bits
  CSI request - 0, 1, 2, 3, 4, 5, or 6 bits
  Code block group (CBG) transmission information - 0, 2, 4, 6, or 8 bits
  Phase tracking reference signal-demodulation reference signal (PTRS-
DMRS) association - 0 or 2 bits.
  beta_offset indicator - 0 or 2 bits
  DMRS sequence initialization - 0 or 1 bit A DCI format 1_0 may be used as fallback DCI for scheduling a PDSCH, and in this case, a CRC may be scrambled with a C-RNTI. The DCI format 1_0 in which a CRC is scrambled with a C-RNTI may include, e.g., information as shown in Table 6.

TABLE 6

Identifier for DCI formats - 1 bit
Frequency domain resource assignment - $[\lceil \log_2(N_{RB}^{DL,BWP}(N_{RB}^{DL,BWP} + 1)/2] \rceil$ bits
Time domain resource assignment - X bits
VRB-to-PRB mapping - 1 bit.
MCS - 5 bits
NDI - 1 bit
RV - 2 bits
HARQ process number - 4 bits
DL assignment index - 2 bits
TPC command for scheduled PUCCH - 2 bits
PUCCH resource indicator - 3 bits
PDSCH-to-HARQ feedback timing indicator - 3 bits A DCI format 1_1 may be used as non-fallback DCI for scheduling a PDSCH, and in this case, a CRC may be scrambled with a C-RNTI. The DCI format 1_1 in which a CRC is scrambled with a C-RNTI may include, e.g., information as shown in Table 7.

TABLE 7

Figure 5:
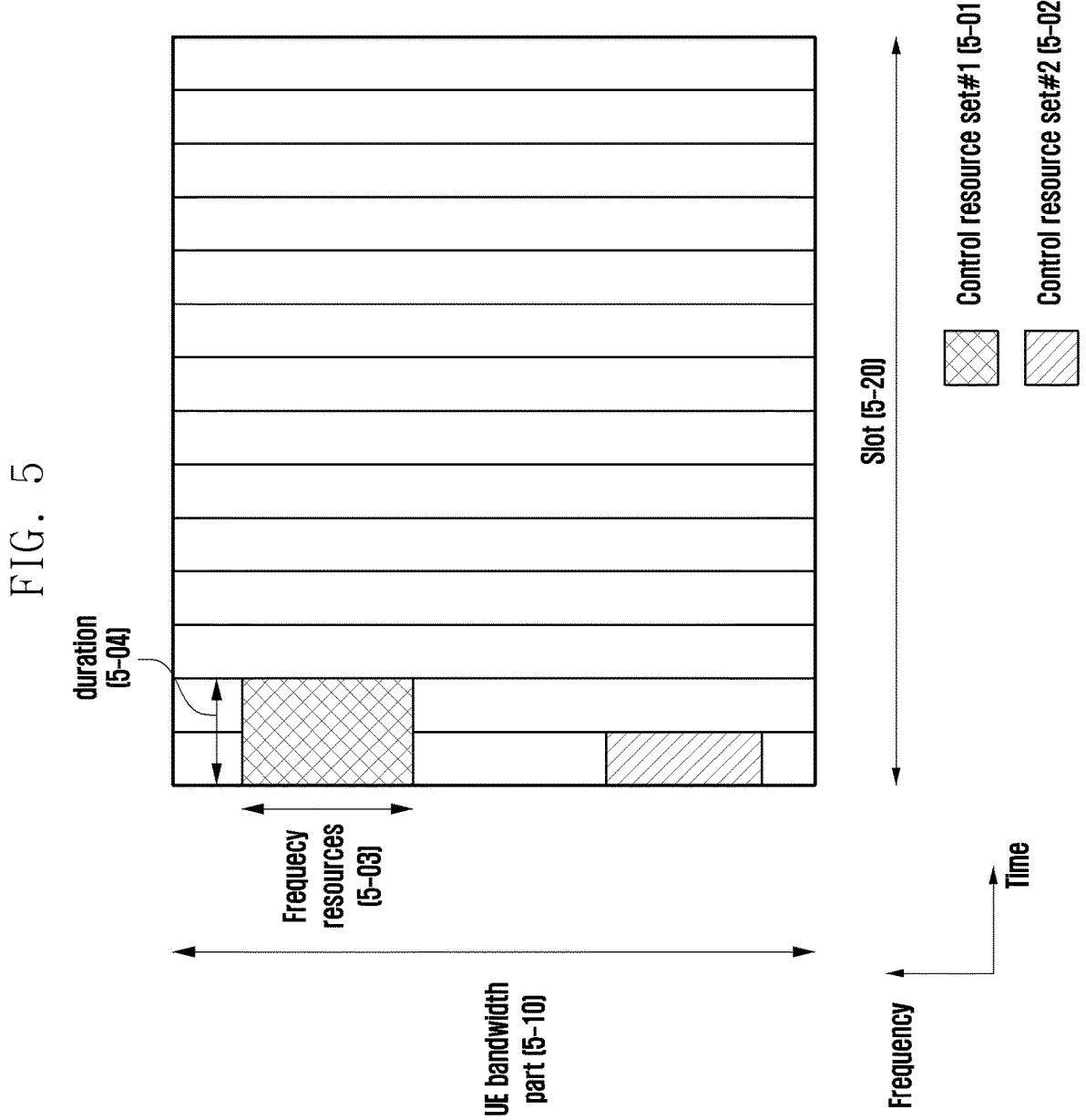
FIG. 5 illustrates a CORESET in which a DL control channel is transmitted in a 5G wireless communication system.

-  Carrier indicator - 0 or 3 bits
-  Identifier for DCI formats - 1 bit
-  BWP indicator - 0, 1 or 2 bits
-  Frequency domain resource assignment
  • For resource allocation type 0, $\lceil N_{RB}^{DL,BWP} / P \rceil$ bits
  • For resource allocation type 1, $\lceil \log_2(N_{RB}^{DL,BWP} + 1) /2) \rceil$
bits
-  Time domain resource assignment −1, 2, 3, or 4 bits
-  VRB-to-PRB mapping - 0 or 1 bit, only for resource allocation
type 1.
  • 0 bit if only resource allocation type 0 is configured;
  • 1 bit otherwise.
-  PRB bundling size indicator - 0 or 1 bit
-  Rate matching indicator - 0, 1, or 2 bits
-  Zero power (ZP) CSI-RS trigger - 0, 1, or 2 bits
For transport block 1:
-  MCS - 5 bits
-  NDI - 1 bit
-  RV - 2 bits
For transport block 2:
-  MCS - 5 bits
-  NDI - 1 bit
-  RV - 2 bits
-  HARQ process number - 4 bits
-  DL assignment index - 0 or 2 or 4 bits
-  TPC command for scheduled PUCCH - 2 bits
-  PUCCH resource indicator - 3 bits
-  PDSCH-to-HARQ_feedback timing indicator - 3 bits
-  Antenna ports - 4, 5 or 6 bits
-  Transmission configuration indication - 0 or 3 bits
-  SRS request - 2 bits
-  CBG transmission information - 0, 2, 4, 6, or 8 bits
-  CBG flushing out information - 0 or 1 bit
-  DMRS sequence initialization - 1 bit FIG. 5 illustrates a CORESET in which a DL control channel is transmitted in a 5G wireless communication system.

Referring to FIG. 5, a UE BWP 5-10 is configured on the frequency axis and two CORESETs (CORESET #1 5-01 and CORESET #2 5-02) are configured within a slot 5-20 on the time axis. The CORESETs 5-01 and 5-02 may be configured to a specific frequency resource 5-03 within the entire UE BWP 5-10 on the frequency axis. One or a plurality of OFDM symbols may be configured to the time axis, and this may be defined as CORESET duration 5-04. In the example of FIG. 5, the CORESET #1 5-01 is configured to CORESET duration of 2 symbols, and the CORESET #2 5-02 is configured to CORESET duration of 1 symbol.

The CORESET in 5G described above may be configured by the base station to the UE through higher layer signaling (e.g., SI, MIB, RRC signaling). Configuring the CORESET to the UE may include providing information such as a CORESET identity, a frequency position of the CORESET, and/or a symbol length of the CORESET. For example, CORESET configuration information may include information as shown in Table 8 below.

TABLE 8

| ControlResourceSet ::= | SEQUENCE { |
| controlResourceSetId | ControlResourceSetId, |
| (CORESET identity) | |
| frequencyDomainResources | BIT STRING (SIZE (45)), |
| (frequency axis resource allocation information) | |

TABLE 8-continued

| | |
|---|---|
| duration | INTEGER (1..maxCoReSetDuration), |
| (time axis resource allocation information) | |
| cce-REG-MappingType | CHOICE { |
| (CCE-to-REG mapping method) | |
| interleaved | SEQUENCE { |
| reg-BundleSize | ENUMERATED {n2, n3, n6}, |
| (REG bundle size) | |
| interleaverSize | ENUMERATED {n2, n3, n6}, |
| (interleaver size) | |
| shiftIndex | |
| INTEGER(0..maxNrofPhysicalResourceBlocks-1) | OPTIONAL |
| (Interleaver shift) | |
| }, | |
| nonInterleaved | NULL |
| }, | |
| precoderGranularity | ENUMERATED {sameAsREG-bundle, |
| all ContiguousRBs}, | |
| tci-StatesPDCCH-ToAddList | SEQUENCE(SIZE (1..maxNrofTCI- |
| StatesPDCCH)) OF TCI-StateId OPTIONAL, | |
| tci-StatesPDCCH-ToReleaseList | SEQUENCE(SIZE (1 .. maxNrofTCI- |
| StatesPDCCH)) OF TCI-StateId OPTIONAL, | |
| tci-PresentInDCI | ENUMERATED {enabled} |
| OPTIONAL, | |
| pdcch-DMRS-ScramblingID | INTEGER (0..65535) |
| OPTIONAL, | |
| ..., | |
| [[ | |
| rb-Offset-r16 | INTEGER (0..5) |
| OPTIONAL, | |
| tci-PresentDCI-1-2-r16 | INTEGER (1..3) |
| OPTIONAL, | |
| coresetPoolIndex-r16 | INTEGER (0..1) |
| OPTIONAL, | |
| controlResourceSetId-v1610 | ControlResourceSetId-v1610 |
| OPTIONAL | |
| ]] | |
| } | |

In Table 8, a coresetPoolIndex may be an index of a CORESET pool to which a configured CORESET belongs. In general, up to 5 CORESETs may be configured, within one BWP, and in this case, a set of CORESETs capable of performing multi-TRP transmission may be configured to the same CORESETPoolIndex. The UE may decode DCI by monitoring a plurality of PDCCHs included in a CORESET in which the CORESETPoolIndex is configured to the same value in at least one BWP. Alternatively, the UE may decode DCI by monitoring a plurality of PDCCHs included in a CORESET in which the CORESETPoolIndex is configured to different values in at least one BWP. Further, the UE may expect to receive fully/partially/non-overlapped PDSCHs scheduled by the DCI.

Figure 6:
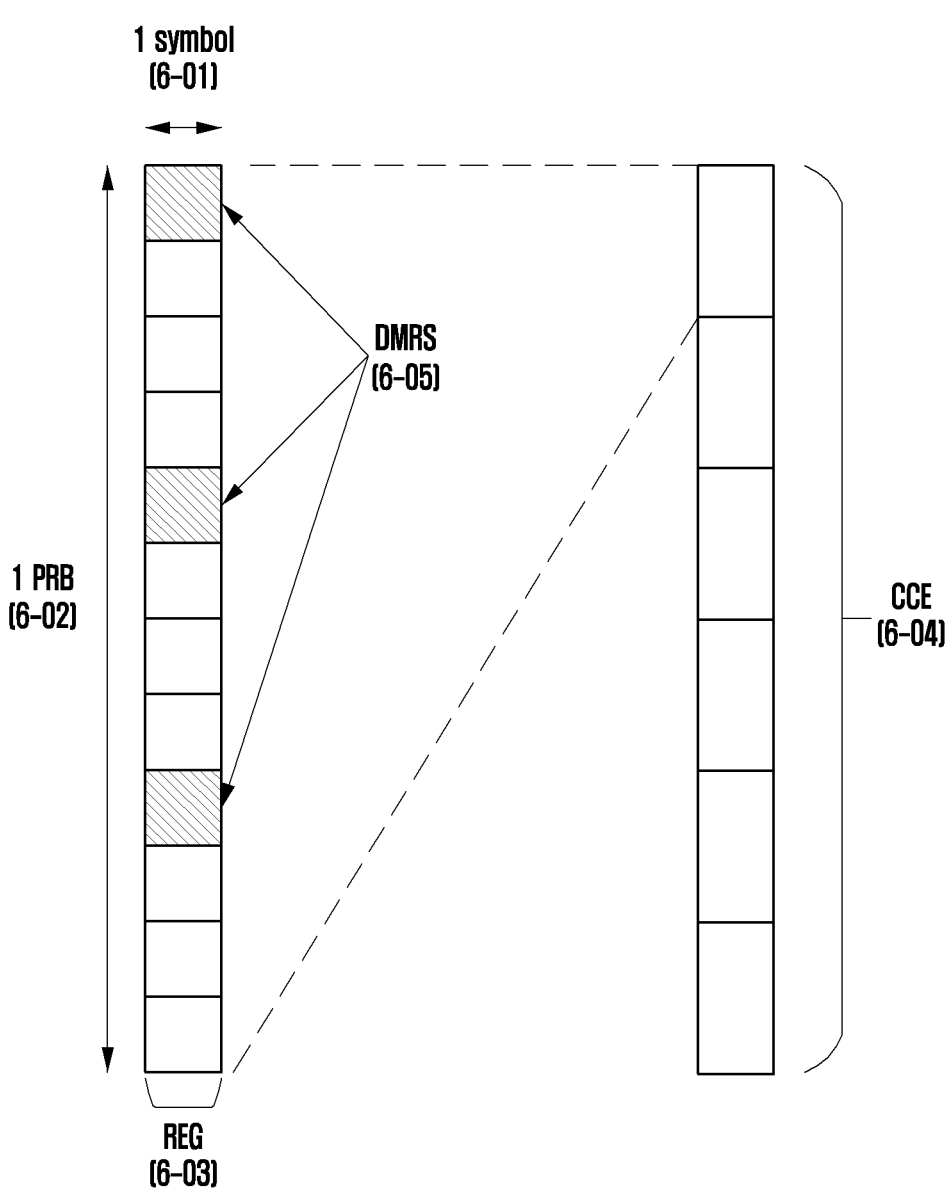
FIG. 6 illustrates basic units of time and frequency resources constituting a DL control channel that may be used in a 5G wireless communication system.

FIG. 6 illustrates time and frequency resources of a DL control channel that may be used in a 5G wireless communication system.

Referring to FIG. 6, a basic unit of time and frequency resources constituting the control channel is referred to as an RE group (REG) 6-03, and the REG 6-03 may be defined to an OFDM symbol 6-01 on the time axis and be defined to a PRIG 6-02, i.e., 12 subcarriers on the frequency axis. A DL control channel allocation unit may be constituted by concatenating the REGs 6-03.

As illustrated in FIG. 6, in 5G, if a basic unit to which a DL control channel is allocated is a control channel element (CCE) 6-04, the CCE 6-04 may be composed of a plurality of REGs 6-03. According, in the example of FIG. 6, the REG 6-03 may be composed of 12 REs, and when the CCE 6-04 is composed of 6 REGs 6-03, the CCE 6-04 may be composed of 72 REs. When a DL CORESET is configured, the corresponding area may be composed of a plurality of CCEs 6-04, and a specific DL control channel may be mapped and transmitted to one or multiple CCEs 6-04 according to an aggregation level (AL) in the CORESET. The CCEs 6-04 in the CORESET are classified by the number, and in this case, the number may be assigned according to a logical mapping method.

The basic unit, i.e., the REG 6-03 of the DL control channel illustrated in FIG. 6, may include both REs to which DCI is mapped and an area to which a DMRS 6-05, which is a reference signal (RS) for decoding the REs, is mapped. As illustrated in FIG. 6, three DMRSs 6-05 may be transmitted within 1 REG 6-03.

The number of CCEs to transmit the PDCCH may be 1, 2, 4, 8, or 16 according to an AL, and the different numbers of CCEs may be used for implementing link adaptation of the DL control channel. For example, in the case that AL=L, one DL control channel may be transmitted through the L number of CCEs. The UE should detect a signal without knowing information on a DL control channel, and a search space representing a set of CCEs is defined for blind decoding. The search space is a set of DL control channel candidates consisting of CCEs in which the UE should attempt to decode on a given AL, and because there are various aggregations levels that make one group with 1, 2, 4, 8, and 16 CCEs, the UE has a plurality of search spaces. A search space set may be defined as a set of search spaces in all configured ALs.

The search space may be classified into a CSS and a UE-specific search space. A certain group of UEs or all UEs may search for the CSS of the PDCCH in order to receive cell-common control information such as dynamic scheduling for SI or paging messages. For example, PDSCH scheduling allocation information for transmission of a system information block (SIB) including cell operator information may be received by searching for the CSS of the PDCCH. In the case of a CSS, because a certain group of UEs or all UEs should receive the PDCCH, the CSS may be defined as a set of pre-promised CCEs. Scheduling assignment information on the UE-specific PDSCH or PUSCH may be received by searching for the UE-specific search space of the PDCCH. The UE-specific search space may be defined UE-specifically as a function of various system parameters and the identity of the UE.

In 5G, a parameter for a search space for a PDCCH may be configured from the base station to the UE through higher layer signaling (e.g., SIB, MIB, or RRC signaling). For example, the base station may configure the number of PDCCH candidates at each AL L, a monitoring period for the search space, a monitoring occasion in symbol units within a slot for the search space, a search space type (CSS or UE-specific search space), a combination of a DCI format and an RNTI to be monitored in a corresponding search space, and a CORESET index to monitor a search space to the UE. For example, information as shown in Table 9 may be configured by the base station.

TABLE 9

```
Search Space ::=                        SEQUENCE {
    -- Identity of the search space. SearchSpaceId = 0 identifies the SearchSpace configured
via PBCH (MIB) or ServingCellConfigCommon.
    searchSpaceId                       SearchSpaceId,
    (search space identifier)
    controlResourceSetId                ControlResourceSetId,
    (CORESET identifier)
    monitoringSlotPeriodicity AndOffset    CHOICE {
    (monitoring slot level period)
        sl1                             NULL,
        sl2                             INTEGER (0..1),
        sl4                             INTEGER (0..3),
        sl5                             INTEGER (0..4),
        sl8                             INTEGER (0..7),
        sl10                            INTEGER (0..9),
        sl16                            INTEGER (0..15),
        sl20                            INTEGER (0..19)
    }
                    OPTIONAL,
    monitoringSymbolsWithinSlot             BIT STRING (SIZE (14))
                                        OPTIONAL,
    (monitoring symbol in slot)
    nrofCandidates                      SEQUENCE {
    (number of PDCCH candidates for each AL)
        aggregationLevel1                   ENUMERATED {n0, n1, n2, n3, n4, n5, n6,
n8},
        aggregationLevel2                   ENUMERATED {n0, n1, n2, n3, n4, n5, n6,
n8},
        aggregationLevel4                   ENUMERATED {n0, n1, n2, n3, n4, n5, n6,
n8},
        aggregationLevel8                   ENUMERATED {n0, n1, n2, n3, n4, n5, n6,
n8},
        aggregationLevel16                  ENUMERATED {n0, n1, n2, n3, n4, n5, n6,
n8}
    },
    searchSpaceType                     CHOICE {
    (search space type)
        -- Configures this search space as CSS and DCI formats to monitor.
        common                              SEQUENCE {
    (common search space)
        }
        ue-Specific                         SEQUENCE {
    (UE-specific search space)
            -- Indicates whether the UE monitors in this USS for DCI formats 0-0 and 1-0 or
for formats 0-1 and 1-1.
            formats                             ENUMERATED {formats0-0-And-1-0,
formats0-1-And-1-1},
            . . .
        }
```

According to the configuration information, the base station may configure one or multiple search space sets to the UE. For example, the base station may configure a search space set 1 and a search space set 2 to the UE, configure to monitor a DCI format A scrambled with an X-RNTI in the search space set 1 in the CSS, and configure to monitor a DCI format B scrambled with a Y-RNTI in the search space set 2 in the UE-specific search space.

According to the configuration information, one or a plurality of search space sets may exist in a CSS or a UE-specific search space. For example, a search space set #1 and a search space set #2 may be configured to CSSs, and a search space set #3 and a search space set #4 may be configured to UE-specific search spaces.

In the CSS, a combination of the following DCI format and RNTI may be monitored.

DCI format 0_0/1_0 with CRC scrambled by C-RNTI, configured scheduling RNTI (CS-RNTI), SP-CSI-RNTI, RA-RNTI, temporary C-RNTI (TC-RNTI), P-RNTI, SI-RNTI DCI format 2_0 with CRC scrambled by STI-RNTI DCI format 2_1 with CRC scrambled by an interruption RNTI (INT-RNTI)

DCI format 2_2 with CRC scrambled by TPC-PUSCH-RNTI, TPC-PUCCH-RNTI

DCI format 2_3 with CRC scrambled by TPC-SRS-RNTI

In the UE-specific search space, a combination of the following DCI format and RNTI may be monitored.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs specified above may follow the following definitions and uses.

C-RNTI: Used for scheduling a UE-specific PDSCH

TC-RNTI: Used for scheduling a UE-specific PDSCH

CS-RNTI: Used for scheduling a semi-statically configured UE-specific PDSCH

RA-RNTI: Used for scheduling a PDSCH in a random access step

P-RNTI: Used for scheduling a PDSCH through which paging is transmitted

SI-RNTI: Used for scheduling a PDSCH through which SI is transmitted

INT-RNTI: Used for notifying whether puncturing is performed for a PDSCH

TPC-PUSCH-RNTI: Used for indicating a power control command for a PUSCH

TPC-PUCCH-RNTI: Used for indicating a power control command for a PUCCH

TPC-SRS-RNTI: Used for indicating a power control command for an SRS

The DCI formats specified above may follow the definitions shown below in Table 10.

TABLE 10

| DCI format | Usage |
|---|---|
| 0_0 | Scheduling of a PUSCH in one cell |
| 0_1 | Scheduling of a PUSCH in one cell |
| 1_0 | Scheduling of a PDSCH in one cell |
| 1_1 | Scheduling of a PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 10-continued

| DCI format | Usage |
|---|---|
| 2_2 | Transmission of TPC commands for a PUCCH and a PUSCH |
| 2_3 | Transmission of a group of TPC commands for SRS transmissions by one or more UEs |

In 5G, as a plurality of search space sets may be configured with different parameters (e.g., parameters in Table 8), the set of search space sets to be monitored by the UE at each time point may be different. For example, in the case that a search space set #1 is configured to an X-slot period and that a search space set #2 is configured to a Y-slot period and that X and Y are different, the UE may monitor both a search space set #1 and a search space set #2 in a specific slot and monitor one of the search space set #1 and the search space set #2 in a specific slot.

In the case that a plurality of search space sets are configured to the UE, the following conditions may be considered in a method of determining a search space set to be monitored by the UE.

Condition 1

The number of PDCCH candidates that may be monitored per slot does not exceed X. A value X may have different values according to the subcarrier spacing, and may be defined, e.g., by Table 11.

TABLE 11

| $\mu$ | Maximum number of PDCCH candidates per slot and per serving cell (X) |
|---|---|
| 0 | 44 |
| 1 | 36 |
| 2 | 22 |
| 3 | 20 |

In Table 11, the subcarrier spacing may be defined as $15*2^{\mu}$ kHz.

Condition 2

The number of CCEs constituting the entire search space per slot (here, the entire search space refers to a set of all CCEs corresponding to a union area of a plurality of search space sets) does not exceed Y. A value Y may have different values according to the subcarrier spacing, and may be defined, e.g., as shown in Table 12 below.

TABLE 12

| $\mu$ | Maximum number of CCEs per slot and per serving cell (Y) |
|---|---|
| 0 | 56 |
| 1 | 56 |
| 2 | 48 |
| 3 | 32 |

In Table 11, the subcarrier spacing may be defined as $15*2^{\mu}$ kHz.

For convenience of description, a situation in which both the above conditions 1 and 2 are satisfied at a specific time point is defined herein as a "condition A". Accordingly, not satisfying the condition A occurs when at least one of the above conditions 1 and 2 is not satisfied.

According to a configuration of the search space sets of the base station, the case that does not satisfy the above-described condition A at a specific time point may occur. In the case that the condition A is not satisfied at a specific time point, the UE may select and monitor only a part of search space sets configured to satisfy the condition A at the corresponding time point, and the base station may transmit a PDCCH to the selected search space set.

As a method of selecting some search spaces from all configured search space sets, the following method may be followed.

In the case that a condition A for a PDCCH is not satisfied at a specific time point (slot), the (or the base station) may preferentially select a search space set in which the search space type is configured as a CSS among search space sets existing at the corresponding time point over a search space set configured to a UE-specific search space.

In the case that all search space sets configured to the CSS are selected (i.e., in the case that the condition A is satisfied even after all search spaces configured to the CSS are selected), the UE (or the base station) may select search space sets configured to a UE-specific search space. In this case, if there are multiple search space sets configured to the UE-specific search space, a search space set having a lower search space set index may have a higher priority. In consideration of a priority, UE-specific search space sets may be selected within a range satisfying a condition A.

Figure 7:
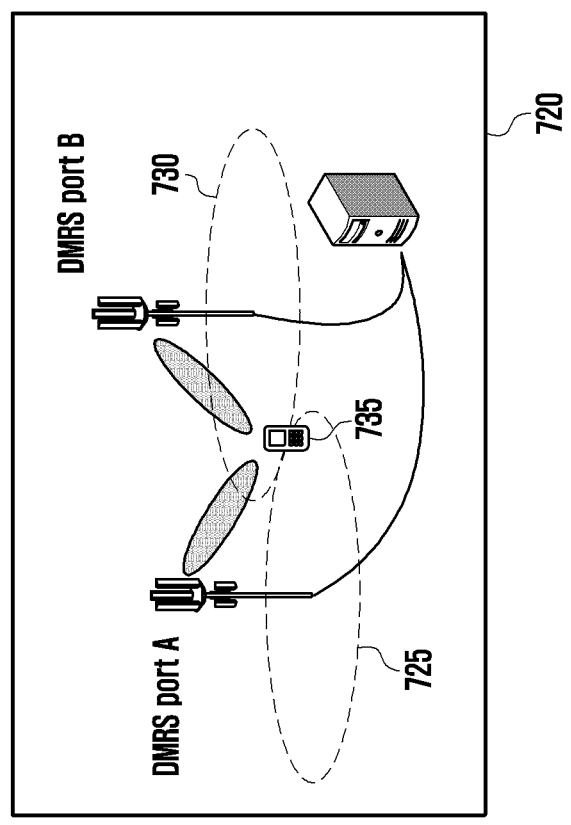
FIG. 7 illustrates a cooperative communication antenna port constitution according to an embodiment.
Figure 7:
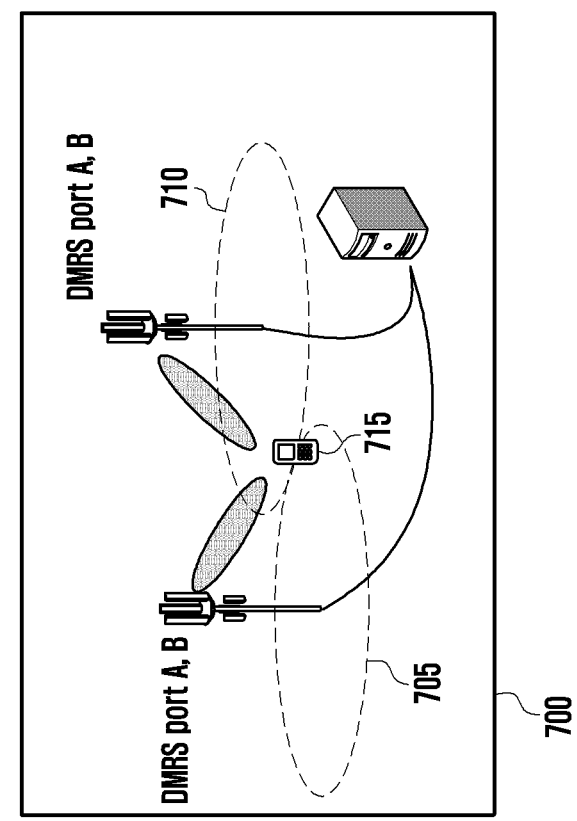

FIG. 7 illustrates a cooperative communication antenna port configuration according to an embodiment.

Referring to FIG. 7, an example of a radio resource allocation for each TRP according to a joint transmission (JT) technique and situation is illustrated.

Window 700 in FIG. 7 illustrates coherent JT (C-JT) supporting coherent precoding between each cell, TRP, and/or beam. In the case of C-JT, a TRP A 705 and a TRP B 710 transmit the same data (e.g., PDSCH), and joint precoding may be performed in multiple TRPs. Accordingly, the TRP A 705 and the TRP B 710 may transmit the same DMRS ports (e.g., DMRS ports A and B in both TRPs). In this case, the UE may receive one DCI information for receiving one PDSCH demodulated by RSs received through DMRS ports A and B.

Window 720 in FIG. 7 illustrates non-coherent JT (NC-JT) supporting non-coherent precoding between each cell, TRP, and/or beam. In the case of NC-JT, different PDSCHs may be transmitted in each cell, TRP and/or beam, and individual precoding may be applied to each PDSCH. Accordingly, a TRP A 725 and a TRP B 730 may transmit different DMRS ports (e.g., a DMRS port A in the TRP A and a DMRS port B in the TRP B). In this case, the UE may receive two types of DCI information for receiving a PDSCH A demodulated by the DMRS port A and a PDSCH B demodulated by another DMRS port B.

In order to support NC-JT that simultaneously transmits data to one UE at two or more transmission points, PDSCHs transmitted at two (or more) different transmission points should be allocated through a single PDCCH or PDSCHs transmitted at two or more different transmission points should be allocated through multiple PDCCHs. The UE may obtain a quasi co-location (QCL) connection relationship between each RS or channel based on L1/L2/L3 signaling and efficiently estimate large scale parameters of each RS or channel through the QCL connection relationship. If transmission points of RSs or channels are different, it is difficult that large scale parameters are shared with each other. Thus, when performing cooperative transmission, the base station should simultaneously notify the UE of QCL information on two or more transmission points through two or more TCI states.

If non-coherent cooperative transmission is supported through multiple PDCCHs, i.e., if two or more PDCCHs allocate two or more PDSCHs to the same serving cell and same BWP at the same time point, each of two or more TCI states may be assigned to each PDSCH to DMRS port through each PDCCH. However, if non-coherent cooperative transmission is supported through a single PDCCH, i.e., if one PDCCH allocates two or more PDSCHs to the same serving cell and the same BWP at the same time point, the two or more TCI states may be allocated to each PDSCH to DMRS port through one PDCCH.

When it is assumed that DMRS ports allocated to the UE at a specific time point are divided into a DMRS port group A transmitted from a transmission point A and a DMRS port group B transmitted from a transmission point B, each of two or more TCI states may be connected to a DMRS port group and the channel may be estimated based on different QCL assumptions for each group. Different DMRS ports may be code division multiplexed (CDMed), FDMed, or time domain multiplexed (TDMed) in order to increase channel measurement accuracy and to reduce transmission burden. When CDM DMRS ports are collectively referred to as a CDM group, the DMRS ports in the CDM group perform well a code-based multiplexing operation in the case that channel characteristics of each port are similar (i.e., in the case that channel characteristics of each port are similar, distinction by an orthogonal cover code (OCC) is made well). Thus, it may be beneficial to prevent DMRS ports existing in the same CDM group from having different TCI states.

Herein, a node may refer to a physical or logical node in a wireless communication system that transmits and receives data to and from a UE through a specific cell. For example, the node may include a TRP, a base station, an eNodeB (or eNB), a gNodeB (or gNB), etc.

According to an embodiment, a first node may be a TRP that transmits and receives data to and from a UE through a first cell, and a second node may be physically divided or separated from the first node and be a TRP that transmits and receives data to and from the UE through the second cell different from the first cell. An operation of transmitting data through a plurality of TRPs described above may be referred to as an M-TRP operation. Further, in the M-TRP operation, each base station may control each TRP, one base station may control a plurality of TRPs, and one base station may control one or a plurality of TRPs.

A function in NR (or 5G) is to support a large number of controllable antenna elements for both transmission and reception. In the case of a high frequency band, a large number of antenna elements may be used for beamforming mainly for the purpose of coverage extension. All NR channels and signals, including those used for control and synchronization, were designed to support beamforming.

In NR, analog beamforming as well as digital precoding and beamforming may be supported for implementation flexibility. In a high frequency band, analog beamforming that forms a beam after converting a signal from digital to analog may be used. In analog beamforming, a reception beam or a transmission beam may be formed in one direction at a given time point. Further, analog beamforming may require a process (beam sweeping) in which the same signal is repeated in a plurality of OFDM symbols, but should be transmitted to different transmission beams. Because a signal may be transmitted with a high gain in any direction through the beam sweeping function, the signal may be transmitted to an intended entire coverage area through a narrow beam.

In the case of analog reception beamforming, the base station may indicate information for selecting a beam through which the UE receives data and control information to the UE. Various signaling methods supporting such a beam management procedure may be considered. The purpose of the beam management is to select and maintain a combination of a direction of a transmission beam of the transmission side and a direction of a reception beam of the reception side so as to maximize a channel gain. When the beam management is efficiently operated, a data rate and throughput may be maximized.

Figure 8:
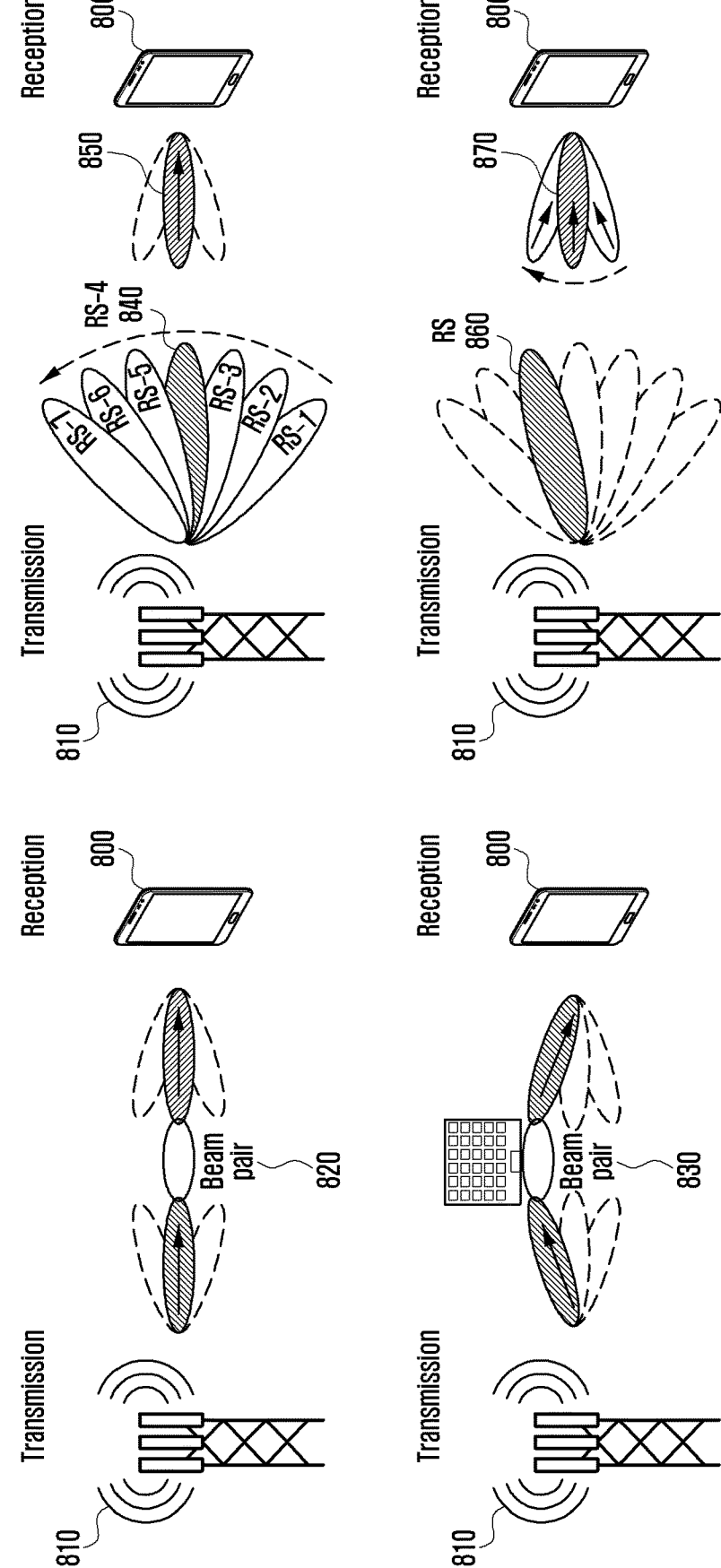
FIG. 8 illustrates a beam management procedure of a wireless communication system.

FIG. 8 illustrates a beam management procedure of a wireless communication system.

Referring to FIG. 8, an optimal beam pair may be a beam pair 820 in which a direction of a DL transmission beam of a base station 810 and a direction of a DL reception beam of the UE 800 directly coincide. Alternatively, in the case that a direct path between the base station 810 and the UE 800 is blocked by an obstacle in a peripheral environment, a beam pair 830 of the transmission beam direction and the reception beam direction along a reflection path may be an optimal beam pair. Such a case may occur especially at high frequency bands where there is little diffraction at corners of obstacles. The base station 810 and the UE 800 may determine an optimal beam pair even in the case that the above-described direct path between the transmitting side and the receiving side is blocked by using the beam management function.

Although FIG. 8 illustrates beamforming in the DL direction, a similar case may be assumed even in beamforming in the UL direction. For example, an optimal transmission and reception beam pair in the DL direction may be an optimal beam pair in the UL direction as well. Similarly, an optimal beam pair in the UL direction may be an optimal beam pair in the DL direction as well. In this case, it may be said that beam relevance (or beam correspondence) is established for DL and UL.

Initial beam establishment may refer to a procedure for establishing an initial beam pair. The base station may transmit an SS block (SSB) corresponding to each beam using different DL beams in an initial access process. The UE may select one of a physical random access channel (PRAM) occasion and a preamble corresponding to each beam to attempt random access to the base station. The base station may identify a DL transmission beam for the UE based on the received random access preamble.

After the initial beam pair is established, a procedure for re-identifying the transmission beam and the reception beam by a movement or rotation of the UE may be required. Alternatively, even in the case that the UE is fixed, a case may occur that a beam is blocked or a beam that was blocked is received by a movement of another object in the vicinity. Accordingly, a procedure for re-identifying the beam pair may be required. The procedure for re-identifying the beam pair as described above may be referred to as a beam adjustment procedure. The beam adjustment may include DL transmitter-side (e.g., base station) beam adjustment and DL receiver-side (e.g., UE) beam adjustment.

In the case of DL transmitter-side beam adjustment, a reception beam of the UE 800 may be maintained, and a transmission beam of the base station 810 may be adjusted. To this end, the base station 810 may sequentially transmit signals using different DL beams. In this way, sequentially transmitting signals by the base station 810 using different beams may be referred to as beam sweeping.

The UE 800 may measure RSs corresponding to the different DL beams while maintaining a reception beam 850. The RS may be a channel state information-RS (CSI-RS) or SSB. Accordingly, the UE 800 may measure a quality of different DL beams of the transmission side. Further, the UE 800 may report different measured beam qualities to the base station 810. According to the above process, an optimum beam 840 of the DL transmission side may be identified.

In the case of DL receiver-side beam adjustment, the base station 810 may maintain a DL transmission beam 860, and the UE 800 may adjust (or beam sweep) the DL reception beam. To this end, the UE 800 may be configured to a set of DL RSs. The UE 800 may sequentially apply the reception beam to the configured RS to measure the RS. The UE 800 may identify an optimal beam 870 of the DL reception side based on the measurement value.

If UL beam adjustment is required, the above-described DL beam adjustment process may be similarly applied.

In NR (or 5G), beam indication (or beam specifying) may be supported. The beam indication may mean indicating (or specifying) to the UE that the PDSCH or PDCCH is being transmitted in the same beam as that of the configured RS (CSI-RS or SSB). Alternatively, the beam indication may mean indicating (or specifying) that the PDSCH or the PDCCH is transmitted using the same spatial filter as that of the configured RS. Herein, transmitting or receiving a PDSCH may refer to transmitting or receiving data through the PDSCH. Further, transmitting or receiving a PDCCH may include transmitting or receiving DCI through the PDCCH. Further, a PDCCH transmission beam or a PDSCH transmission beam may include a transmission beam used by the base station in order to transmit a PDCCH or PDSCH to the UE, and a PDCCH reception beam or a PDSCH reception beam may include a reception beam used by the UE in order to receive a. PDCCH or a PDSCH.

The beam indication may be performed through DL signaling using TCI state information. The TCI state information may include information of one or more SS/physical broadcast channel (PBCH) block (or SSB) indexes or CSI-RS indexes.

The base station may notify the UE of beam information related to DL transmission (e.g., a PDSCH or PDCCH transmission) through the TCI state information. For example, the UE may assume that the PDSCH or the PDCCH is transmitted through the same beam as a DL transmission beam through which the RS (CSI-RS or SSB) included in the TCI state information is transmitted.

The base station may configure N (e.g., maximum 178) of TCI state lists to the UE. The N TCI state list may be included in information (e.g., PDSCH-Config) for a PDSCH configuration in a configuration message (e.g., an RRC message) transmitted from the base station to the UE. Each TCI state of the TCI state list (e.g., tci-StatesToAddModList) included in the information for the PDSCH configuration may indicate a DL RS (SSB or CST-RS) index in a QCL relationship with a DMRS port of the PDSCH.

Further, the base station may configure M (e.g., maximum 64) of candidate TCI states for the PDCCH used for indicating (or specifying) a beam through which the PDCCH is transmitted, among the N TCI states, through a configuration message. Candidate TCI states for the PDCCH used for indicating a beam through which the PDCCH is transmitted may be referred to as a tci-StatesPDCCH. Some of the M candidate TCI states for the PDCCH may be selected and each may be included in information for configuring a CORESET related to the PDCCH. For example, a list (e.g., tci-StatesPDCCH-ToAddList) of candidate TCI states for the PDCCH may be included in each CORESET configuration information. Each CORESET configuration information may include information according to Table 8 described above.

Each TCI state and QCL relationship may be configured to the UE through RRC parameters TCI-State and QCL-Info, as illustrated in Table 13.

TABLE 13

| | |
|---|---|
| TCI-State ::= | SEQUENCE { |
| tci-StateId | TCI-StateId, |
| (ID of TCI state) | |
| qcl-Type1 | QCL-Info, |
| (QCL information of a first reference RS of the RS (target RS) referring to the TCI state ID) | |
| qcl-Type2 | QCL-Info |
| OPTIONAL, --Need R. | |
| (QCL information of a second reference RS of the RS (target RS) referring to the TCI state ID) | |
| ... | |
| } | |
| QCL-Info ::= | SEQUENCE { |
| cell | ServCellIndex |
| OPTIONAL, -- Need R | |
| (Index of a serving cell of a reference RS indicated by QCL information) | |
| bwp-Id | BWP-Id |
| OPTIONAL, -- Cond CSI-RS-Indicated | |
| (Index of BWP of a reference RS indicated by QCL information) | |
| referenceSignal | CHOICE { |
| (reference RS ID indicated by QCL information) | |
| csi-rs | NZP-CSI-RS-ResourceId, |
| ssb | SSB-Index |
| (either CSI-RS ID or SSB-ID) | |
| }, | |
| qcl-Type | ENUMERATED {typeA, |
| typeB, typeC, typeD}, | |
| ... | |
| } | |

In a wireless communication system, one or more different antenna ports (or channels, signals, or combinations thereof) may be associated with each other by a QCL configuration such as QCL-Info in Table 13.

Specifically, the QCL configuration may connect two different antenna ports in a relationship between a (QCL) target antenna port and a (QCL) reference antenna port, and the UE may apply (or assume) all or part of statistical characteristics of the channel measured at the reference antenna port (e.g., large scale parameters of the channel, such as Doppler shift, Doppler spread, average delay, delay spread, average gain, spatial reception (or transmission) parameters, or reception spatial filter coefficients or transmission spatial filter coefficients of the UE) when receiving a target antenna port.

The target antenna port refers to an antenna port that transmits a channel or signal configured by higher layer configuration including the QCL configuration or an antenna port that transmits a channel or signal to which a TCI state indicating the QCL configuration is applied.

The reference antenna port refers to an antenna port that transmits a channel or signal indicated (specified) by a referenceSignal parameter in the QCL configuration.

Specifically, statistical characteristics of channels limited by the QCL configuration (indicated by the parameter qcl-Type within the QCL configuration) may be classified as follows according to the QCL type.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-Type': {Spatial Rx parameter}

In this case, QCL types are not limited to the above four types, but all possible combinations are not listed in order not to obscure the gist of description.

A QCL-TypeA is a QCL type, used if all measurable statistical characteristics in the frequency and time axes may be referenced because the bandwidth and transmission period of the target antenna port are sufficient compared to the reference antenna port (i.e., in the case that the number of samples and transmission band/time of the target antenna port in both the frequency axis and the time axis are more than the number of samples and transmission band/time of the reference antenna port).

A QCL-TypeB is a QCL type used if a bandwidth of the target antenna port is sufficient to measure statistical characteristics measurable in the frequency axis, that is, Doppler shift and Doppler spreads.

A QCL-TypeC is a QCL type used if a bandwidth and transmission period of the target antenna port are insufficient to measure second-order statistics, i.e., Doppler spread and delay spread and that only first-order statistics, i.e., Doppler shift and average delay may be thus referenced.

A QCL-TypeD is a QCL type configured when spatial reception filter values used upon receiving the reference antenna port may be used upon receiving the target antenna port.

The base station may configure or indicate maximum two QCL configurations to one target antenna port through a TCI state configuration.

Among two QCL configurations included in one TCI state configuration, a first QCL configuration may be configured to one of QCL-Type A, QCL-TypeB, or QCL-TypeC. In this case, the configurable QCL type is specified according to the type of a target antenna port and a reference antenna port, and will be described in detail below. Further, among two QCL configurations included in the one TCI state configuration, a second QCL configuration may be configured to QCL-TypeD and be omitted in some cases.

The base station may transmit the configuration information to the UE through a configuration message (e.g., RRC message), and the UE may store the configuration information. Thereafter, if there is a change in a beam in which the DL signal is transmitted, the base station may transmit an MAC CE and/or DCI to the UE to indicate the changed beam. The UE may identify that a DL signal is transmitted through a beam such as an RS (e.g., CSI-RS or SSB) associated with the TCI state configured for each CORESET (e.g., the UE may assume that the DL signal has been transmitted through a spatial filter such as the RS).

3GPP RAN1 defines the use of a common beam with a method of reducing the overall complexity by reducing the transmission and reception burden of control information used for the beam control and simplifying the operation of the UE and the base station, and the common beam may operate with a method of designating a common TCI state.

In using the common beam, the base station may transmit information on beams commonly used for transmission and reception of one or more channels or signals to the UE in the form of a TCI index and a TCI state. The UE obtains information on the TCI state from the received beam control information, and in the case that the obtained TCI state value is different from the common TCI state value stored by the UE, the UE may change the common TCI state value to the obtained TCI state value and notify the base station that reception of the TCI state value was successful through transmission of an Ack signal. The common TCI state value modified through the above process may be applied to transmission and reception of channels and signals thereafter.

Figure 9:
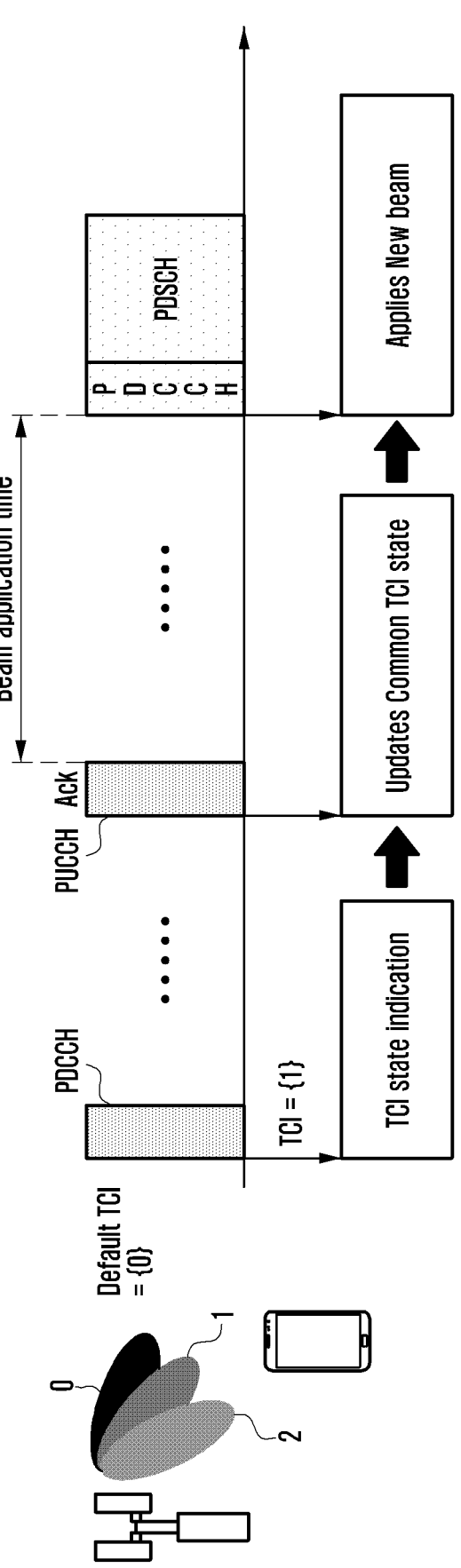
FIG. 9 illustrates an example in which a common TCI state is applied according to an embodiment.

FIG. 9 illustrates a common TCI state being applied according to an embodiment.

Referring to FIG. 9, transmission and reception beams of a PDCCH, a PDSCH, a PUCCH, and a PUSCH are controlled by a designated common TCI state. In FIG. 9, it is assumed that the base station configures candidate beams represented by three TCI indices {0, 1, 2} to the UE and that the beam represented by a TCI index 0 is configured as an initial use beam. The operation of the base station and the UE may be composed of a first step in which the base station transmits {TCI=1}, which is a new TCI index through the PDCCH and in which the UE receives {TCI=1}, a second step in which the UE identifies the control information and reports conversion of a transmission and reception beam to a beam indicated by the TCI index=1 to the base station through a PUCCH and ACK, and a third step of applying the new beam to communication between the base station and the UE.

The common beam-based communication technique may support a UE beam control of the base station in the manner exemplified above in the case that the UE communicates with a single TRP, and present the benefit of beam formation of the base station and the UE, control complexity reduction, and beam control information amount reduction by using a single beam. Further, as described above, because the beam control of the control channel indicated by the PDCCH may be performed through dynamic control information transmitted through the PDCCH, there is also an advantage that beam reliability of the control channel may be secured in an environment in which the channel changes rapidly.

However, in the case of an m-TRP system in which the UE communicates with multiple TRPs, it may be difficult to apply the common beam-based communication technique. In a scenario in which the UE performs communication through a plurality of transmission and reception nodes, in a general case, communication between the UE and each node may be performed through different beams, and the base station may transmit beam information for each TRP or information on multiple beams to the UE in the form of multiple TCI state information.

Figure 10:
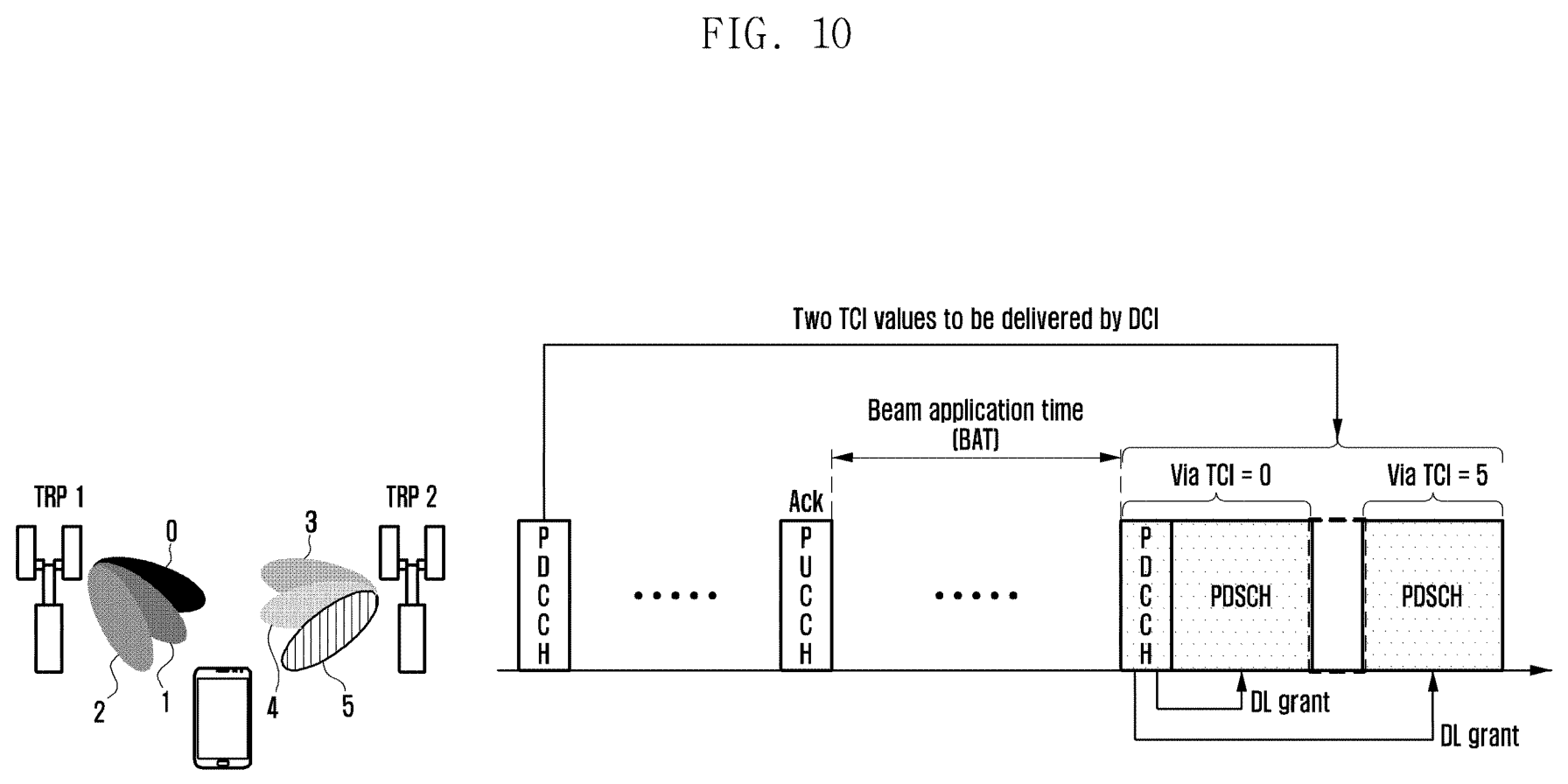

FIG. 10 illustrates two TCI state values being indicated for an m-TRP operation according to an embodiment.

Referring to FIG. 10, if one TRP instructs the UE to receive two PDSCHs transmitted from different TRPs through transmission of one PDCCH, the UE should receive one TCI state value (e.g., TCI index=0) for receiving the PDCCH and one PDSCH and another TCI state value (e.g., TCI index=5) for receiving the remaining PDSCH.

Figure 11:
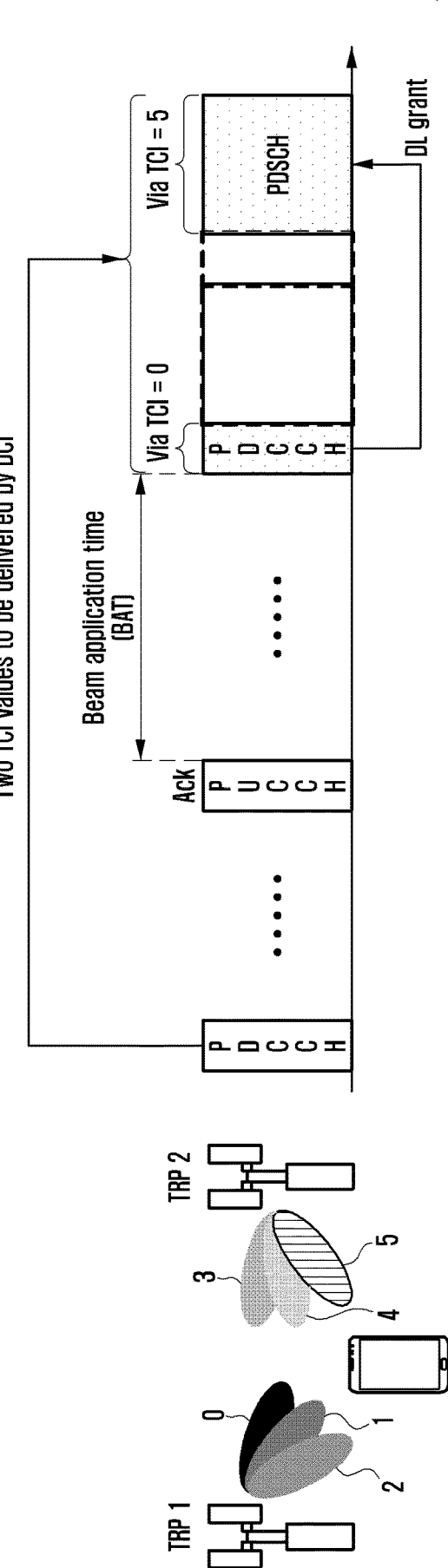
FIG. 11 illustrates two TCI state values being indicated for an m-TRP operation according to an embodiment.

FIG. 11 illustrates two TCI state values being indicated for an m-TRP operation according to an embodiment.

Referring to FIG. 11, if one TRP instructs the UE to receive a PDSCH transmitted from another TRP through PDCCH transmission, the UE should receive one TCI state value for PDCCH reception and another TCI state value for PDSCH reception.

As it may be identified in the examples of FIGS. 10 and 11, the TRP should instruct the UE to update two TCI states, and also transmit information on beams to be used for reception and transmission of each scheduled PDSCH or PUSCH. For example, the TRP should transmit additional information for indicating which of the two TCI states indicated to the UE and updated and maintained by the UE is a TCI state indicating a beam used for receiving control information (e.g., PDCCH) or a TCI state indicating a beam used for transmission and reception of a PDSCH/PUSCH scheduled by the PDCCH.

To transmit the above-described additional information, a method of transmitting a TCI state index through DCI may be considered. For example, two independent TCI state indices may be generated, and each TCI state index may indicate a TCI state used for PDCCH reception and a TCI state applied to PDSCH/PUSCH transmission and reception. However, this method may increase the DCI size and require the design of a new DCI format.

According to an embodiment, for each CORESET, information on a beam to be used for reception of a PDCCH mapped to the corresponding CORESET and a beam to be used for transmission and reception of a PDSCH/PUSCH scheduled by the PDCCH mapped to the CORESET may be configured in the form of a separate TCI state. If only one TCI state is configured to the CORESET and the PDCCH received through the corresponding CORESET schedules the PDSCH or PUSCH, the UE may receive a PDCCH using the beam allocated to the CORESET and perform transmission and reception of the PDSCH or PUSCH with the same beam as the beam. However, if two or more TCI states are configured to the CORESET and the PDCCH received through the corresponding CORESET schedules the PDSCH or PUSCH, the UE may receive a PDCCH using a beam corresponding to ant one TCI state of the TCI states in the CORESET and perform transmission and reception of the PDSCH or the PUSCH with a beam corresponding to a TCI state different from that of the beam.

Figure 12:
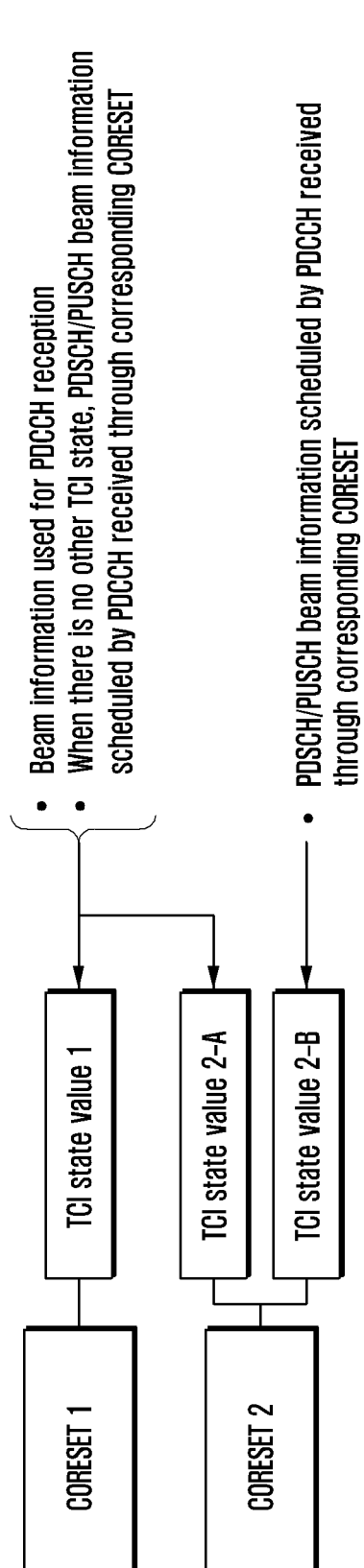
FIG. 12 illustrates a method of configuring and indicating a plurality of TCI states for each CORESET according to an embodiment.

FIG. 12 illustrates a method of configuring and indicating a plurality of TCI states for each CORESET according to an embodiment.

Referring to FIG. 12, as in the above-described examples of FIGS. 10 and 11, if two TCI state values are to be indicated for an m-TRP operation, a method of configuring and indicating one or multiple TCI states for each CORESET may be performed.

In one example, it is assumed that only a TCI state 1 is configured to a CORESET 1 and that a TCI state 2-A and a TCI state 2-B are configured to a CORESET 2. The UE may receive a PDCCH of the CORESET 1 using a beam corresponding to the TCI state 1. The UE may receive a PDSCH scheduled by a PDCCH of the CORESET 1 or transmit a PUSCH using a beam corresponding to the TCI state 1. Further, the UE may receive the PDCCH of the CORESET 2 using a beam corresponding to the TCI state 2-A, but receive a PDSCH scheduled by the PDCCH of the CORESET 2 or transmit a PUSCH using a beam corresponding to the TCI state 2-B.

Figure 13:
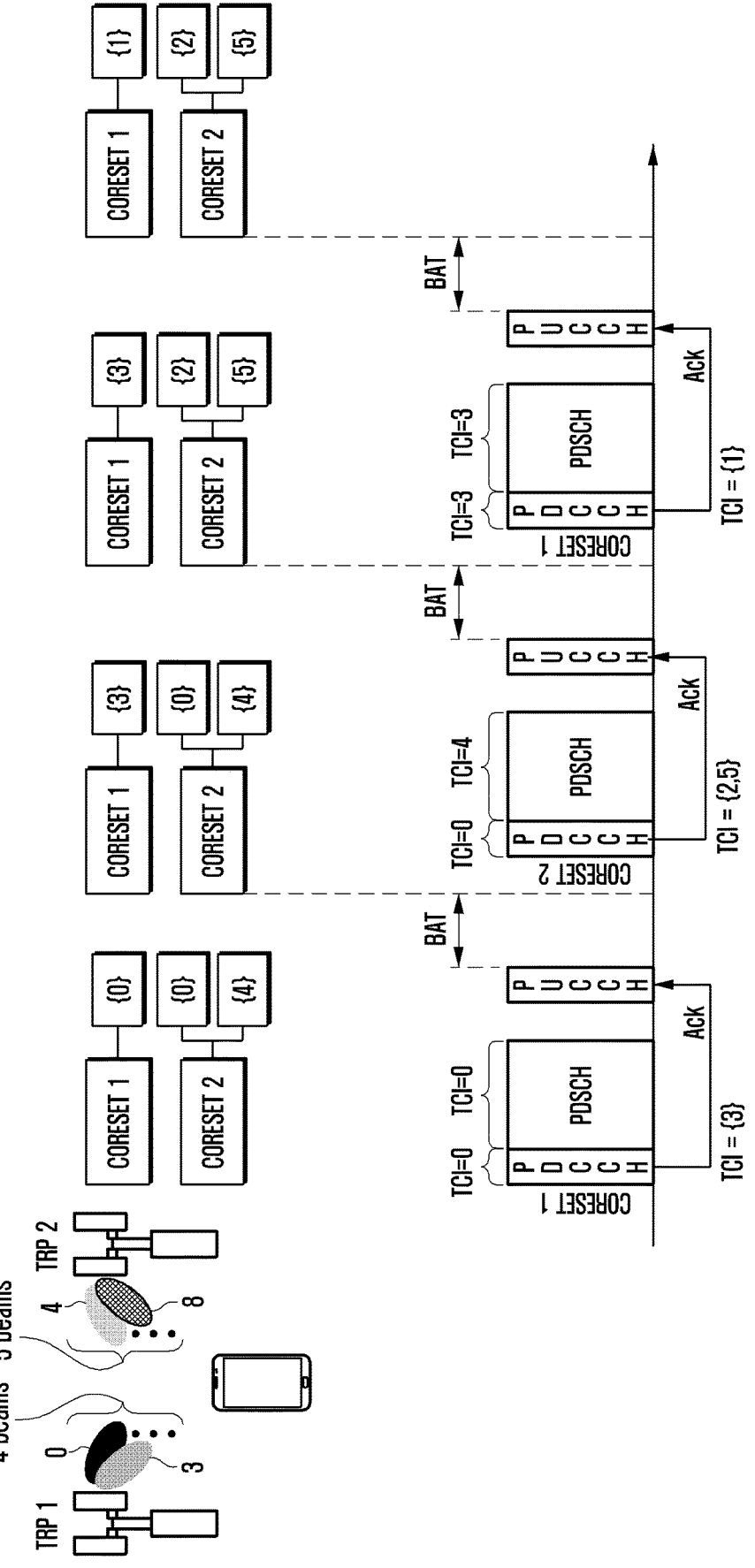
FIG. 13 illustrates a beam control method in which one TRP is dedicated to a PDCCH transmission according to an embodiment.

FIG. 13 illustrates a beam control method in which one TRP is dedicated to PDCCH transmission according to an embodiment.

Referring to FIG. 13, as in the above-described example of FIG. 12, if one or a plurality of TCI states are configured for each CORESET and that one TRP is dedicated to PDCCH transmission, a beam control method may be performed. For example, a TRP 1 of two TRPs is dedicated to PDCCH transmission, and as an initial configuration of the TCI state for each CORESET, it is assumed that TCI={0} is configured to a CORESET 1 and that TCI={0, 4} is configured to a CORESET 2. The UE may receive a first PDCCH using a beam corresponding to TCI state=0, which is a ICI state value configured to the CORESET 1. If the PDCCH schedules the PDSCH and includes information indicating TCI={3}, the UE may receive a PDSCH using the same beam (a beam corresponding to TCI state=0) as that of the PDCCH. Thereafter, the UE may transmit a PUCCH including an ACK for the received PDSCH to the base station, and update the TCI state value configured to the CORESET 1 to TCI={3}, which is the received TCI state value.

The UE may receive a second PDCCH using a beam corresponding to TCI state=0, which is a TCI state value indicating a PDCCH reception beam among TCI state values configured to the CORESET 2. The second PDCCH may schedule the PDSCH and include information indicating TCT={2, 5}. Further, the UE may receive a PDSCH scheduled by the PDCCH using a beam corresponding to TCI state=4, which is a TCI state value indicating a reception beam of the PDSCH among TCI state values configured to the CORESET 2. Thereafter, the UE may transmit a PUCCH including an ACK for the received PDSCH to the base station and update two TCI state values configured to the CORESET 2 to TCI={2, 5}, which is the received TCI state value.

The UE may receive a third PDCCH using a beam corresponding to TCI state=3, which is a TCI state value for the CORESET 1 updated by receiving the first PDCCH. The third PDCCH may schedule the PDSCH and include information indicating TCI={1}. The UE may receive a PDSCH scheduled by the PDCCH using the same beam (a beam corresponding to TCI state=3) as that of the PDCCH. Thereafter, the UE may transmit a PUCCH including an ACK for the received PDSCH to the base station and update a TCI value configured to the CORESET 1 to TCI={1}, which is a TCI state value indicated by the PDCCH.

Although a maximum of 2 TCI states are allocated for each CORESET in the example described above, the number of TCI states allocated for each CORESET is not limited to a maximum of 2. For example, it is also possible to allocate 3 or more TCI states. Further, it is possible to change the number of TCI states allocated for each CORESET.

Figure 14:
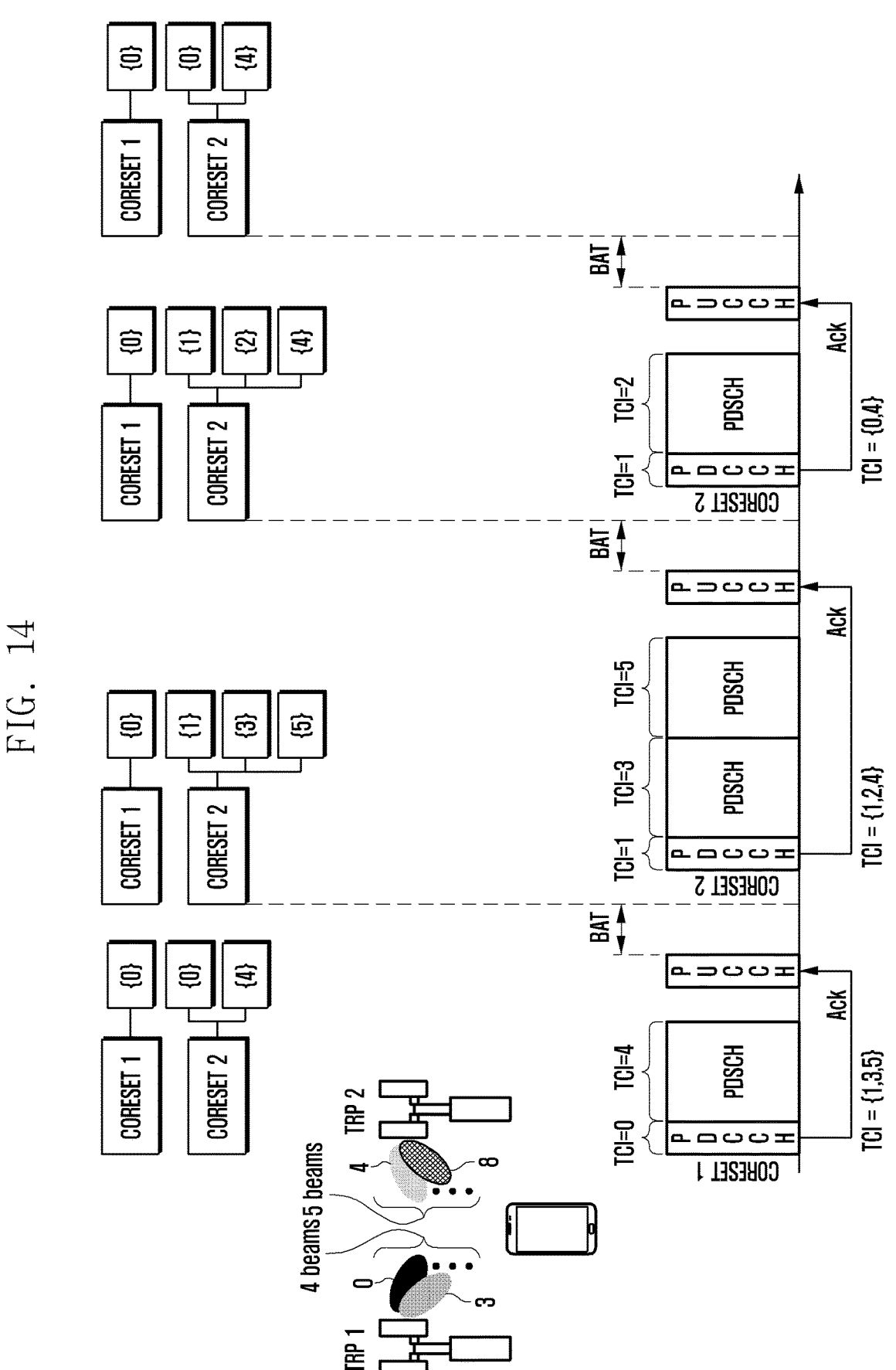
FIG. 14 illustrates a method of changing a number of allocated TCI states for each CORESET if one TRIP is dedicated to a PDCCH transmission according to an embodiment.

FIG. 14 illustrates a method of changing a number of allocated TCI states for each CORESET if one TRP is dedicated to PDCCH transmission according to an embodiment.

Referring to FIG. 14, as in the above-described example of FIG. 13, a beam control method is applied, but in FIG. 14, the number of TCI states allocated to the CORESET 2 is changed from 2 to 3 and again from 3 to 2.

More specifically, a TRP 1 of two TRPs is dedicated to PDCCH transmission, and as an initial configuration, it is assumed that TCI state={0} is configured to a CORESET 1 and that TCI state={0, 4} is configured to a CORESET 2. The UE may receive a first PDCCH through a beam corresponding to TCI state=0 according to the TCI state configured to the CORESET 2. The PDCCH may schedule the PDSCH and include information indicating TCI={1,3,5}. The UE may receive a PDSCH through a beam corresponding to TCI state=4. The UE may transmit a PUCCH including an ACK for the PDSCH to the base station, and update a TCI state value configured to the CORESET 2 to three TCI state values according to TCI={1,3,5}.

The UE may receive a second PDCCH using a beam corresponding to TCI state=1, which is information indicating a PDCCH reception beam among updated TCI state values for the CORESET 2. In the case of PDSCH reception, two TCI state values are configured to the CORESET 2 for PDSCH reception, and the PDCCH indicates update of the two TCI state values. Thus, the UE may understand that the PDCCH has indicated PDSCH repetition via different beams. Therefore, repeated PDSCH reception may be performed through beams corresponding to each of TCI state=3 and TCI state=5. Further, TCI state update may be performed in a manner similar to that in the previous step operation. For example, the PDCCH may schedule the PDSCH and include information indicating TCT={1,2,4}, and the UE may transmit a PUCCH including an ACK for the PDSCH to the base station, and update a TCI state value configured to the CORESET 2 to three TCT state values according to TCI={1,2,4}.

When the UE receives a third PDCCH through the CORESET 2, the PDCCH indicates to update the number of TCI states for PDSCH reception from two to one. Thus, the UE may understand that the PDCCH receives only one PDSCH without PDSCH repetition. Accordingly, the UE may receive a PDSCH using a beam corresponding to any one of two values of TCI state=2 and TCI state=4, which are TCI state values for PDSCH reception allocated to the CORESET 2. Which of two TCI state values configured for PDSCH reception is used for PDSCH reception may be determined by a separately defined rule or follow a separate configuration or indication.

Although PDCCH transmission may be performed through only one TRP in the examples above, the disclosure is not limited thereto. For example, the disclosure may be applied even if each TRP independently performs scheduling through each PDCCH transmission. Further, although the operations of the disclosure have been described in sequential order for convenience of description, the scope of the disclosure is not limited to this order.

Figure 15:
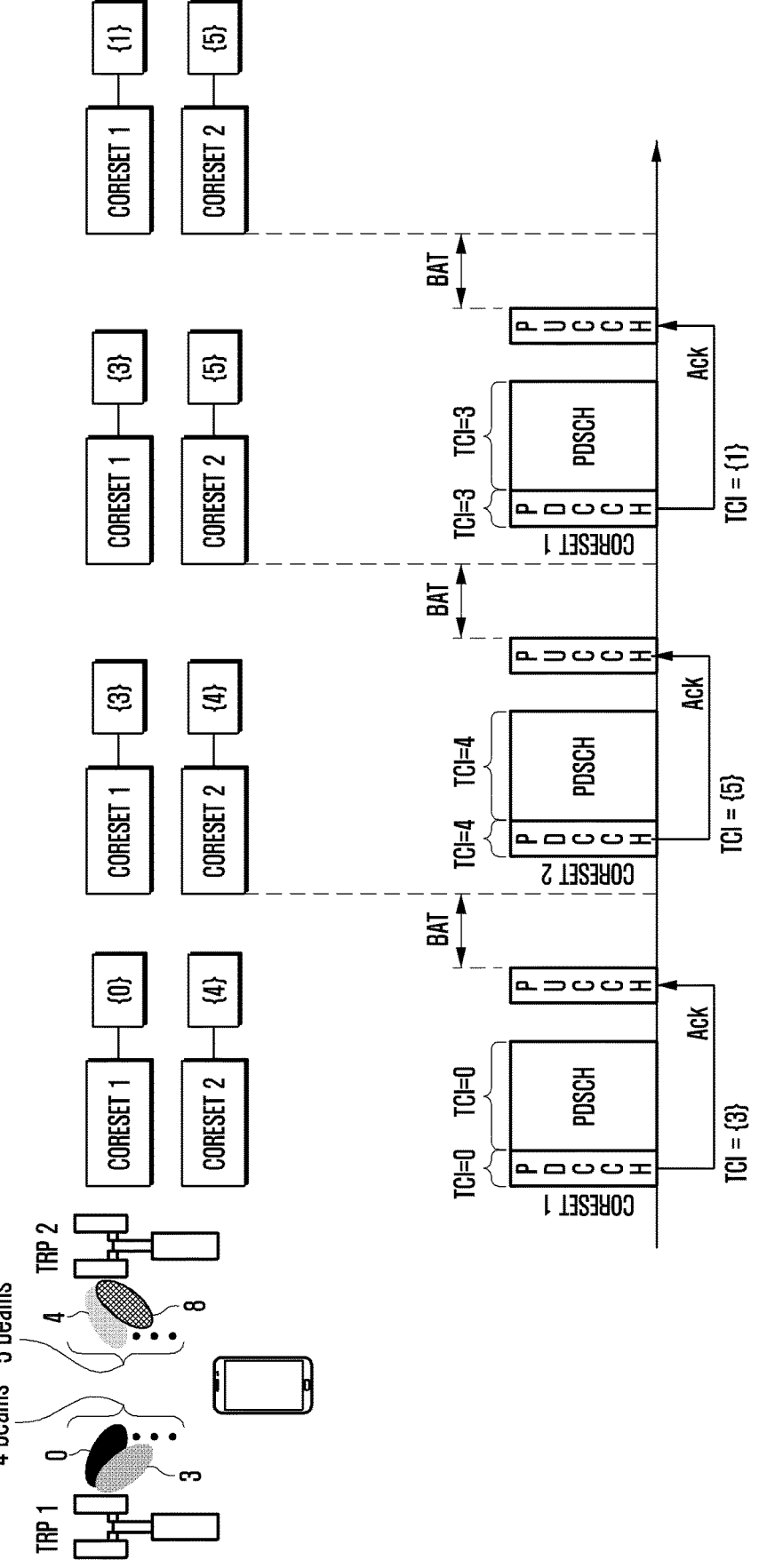
FIG. 15 illustrates a beam control method in which each of a plurality of TRPs performs independent scheduling through a PDCCH transmission according to an embodiment.

FIG. 15 illustrates a beam control method in which each of a plurality of TRPs performs independent scheduling through PDCCH transmission according to an embodiment.

Referring to FIG. 15, as in the above-described examples of FIGS. 10 and 11, if two TCI state values are to be indicated for an m-TRP operation, a method of configuring and indicating one TCI state for each CORESET may be performed. For example, TRP 1 and TRP 2 each perform independent scheduling through PDCCH transmission, and as an initial configuration of the TCI state for each CORE-SET, it is assumed that TCI={0} is configured to a CORE-SET 1 and that TCI={4} is configured to a CORESET 2. The UE may receive a first PDCCH using a beam corresponding to TCI state=0, which is a TCI state value configured to the CORESET 1. If the PDCCH schedules the PDSCH and includes information indicating TCI={3}, the UE may receive a PDSCH using the same beam (a beam corresponding to TCI state=0) as that of the PDCCH. Thereafter, the UE may transmit a PUCCH including an ACK for the received PDSCH to the base station and update the TCI state value configured to the CORESET 1 to TCI={3}, which is the received TCI state value.

The UE may receive a second PDCCH using a beam corresponding to TCI state=4, which is a TCI state value configured to the CORESET 2. If the PDCCH schedules the PDSCH and includes information indicating TCI={5}, the UE may receive a PDSCH using the same beam (a beam corresponding to TCI state=4) as that of the PDCCH. Thereafter, the UE may transmit a PUCCH including an ACK for the received PDSCH to the base station and update the TCI state value configured to the CORESET 2 to TCI={5}, which is the received TCI state value.

The UE may receive a third PDCCH using a beam corresponding to TCI state=3, which is a TCI state value for the CORESET 1 updated by receiving the first PDCCH. The third PDCCH may schedule the PDSCH and include information indicating TCI={1}. The UE may receive a PDSCH scheduled by the PDCCH using the same beam (a beam corresponding to TCI state=3) as that of the PDCCH.

Thereafter, the UE may transmit a PUCCH including an ACK for the received PDSCH to the base station and update a TCI state value configured to the CORESET 1 to a TCI state value TCT={1} indicated by the PDCCH.

When repeated PDCCH transmissions through a plurality of TRPs are possible, CORESET 1 and the CORESET 2 supporting PDCCH transmission and reception through different beams (or other beams corresponding to different TRPs) may be configured in association with each other. The UE may receive PDCCHs repeatedly transmitted through the CORESET 1 and the CORESET 2 using a beam corresponding to the TCI state configured to the CORESET 1 and a beam corresponding to the TCI state configured to the CORESET 2. If DCI transmitted by the repeated PDCCHs includes only one TCI state value, the UE may assume that only PDCCH repetition occurs without PDSCH repetition. For example, the UE may receive repeatedly transmitted PDCCHs using beams corresponding to the TCI state of each CORESET and receive a PDSCH using a beam corresponding to the TCI state configured to any one CORESET among each CORESET. However, if DCI transmitted by the repeated PDCCHs includes two or more TCI state values, the UE may assume that PDSCH repetition occurs together with PDCCH repetition. For example, the UE may receive PDCCHs repeatedly transmitted using beams corresponding to the TCI state of each CORESET and receive PDSCHs repeatedly transmitted using beams corresponding to the TCI state configured to each CORESET.

Figure 16:
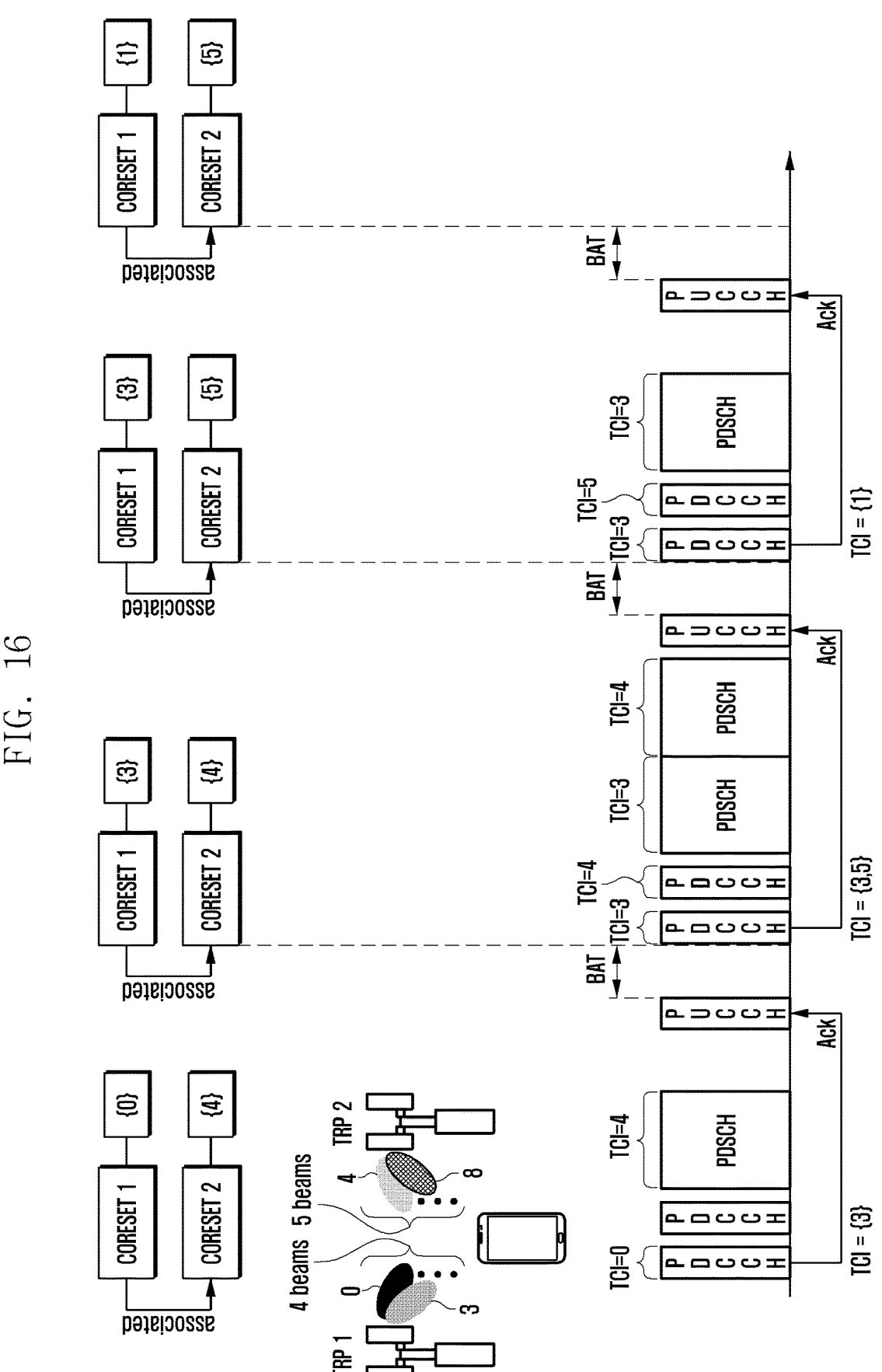
FIG. 16 illustrates a beam control method in which repeated PDCCH transmission is possible through a plurality of TRPs according to an embodiment.

FIG. 16 illustrates a beam control method in which repeated PDCCH transmissions are possible through a plurality of TRPs according to an embodiment.

Referring to FIG. 16, as in the above-described examples of FIGS. 10 and 11, if two TCI state values are to be indicated for an m-TRP operation, a method of configuring and indicating one TCI state for each CORESET may be performed. For example, repeated PDCCH transmission using TRP 1 and TRP 2 is supported, and as an initial configuration of the TCI state for each CORESET, it is assumed that TCI={0} is configured to the CORESET 1 and that TCI={4} is configured to the CORESET 2, and in this case, it is assumed that the CORESET 1 and the CORESET 2 are configured in association with each other. The UE may receive first PDCCHs repeatedly transmitted using a beam corresponding to TCI state=0, which is a TCI state value configured to the CORESET 1, and a beam corresponding to TCI state=4, which is a TCI state value configured to the CORESET 2. If the PDCCHs schedule the PDSCH and include information indicating TCI={3}, DCI transmitted by the repeated PDCCHs includes only one TCI state value. Thus, the UE may assume that only PDCCH repetition occurs without PDSCH repetition. The UE may receive a PDSCH using the same beam (e.g., a beam corresponding to TCI state=0) as that of the PDCCH of any one (e.g., CORESET 1) of the CORESET 1 and the CORESET 2. Thereafter, the UE may transmit a PUCCH including an ACK for the received PDSCH to the base station and update the TCI state value configured to the CORESET 1 to TCI={3}, which is the received TCI state value.

The UE may receive second PDCCHs repeatedly transmitted using a beam corresponding to TCI state=3, which is an updated TCI state value for the CORESET 1, and a beam corresponding to TCI state=4, which is a TCI state value configured to the CORESET 2. If the PDCCHs schedule the PDSCH and include information indicating TCI={3,5}, DCI transmitted by the repeated PDCCH includes two or more TCI state values. Thus, the UE may assume that PDCCH repetition and PDSCH repetition occur. The UE may receive repeated PDSCHs using the same beams (a beam corresponding to TCI state=3 and a beam corresponding to TCI state=4) as those of the repeated PDCCHs. Thereafter, the UE may transmit a PUCCH including an ACK for the received PDSCHs to the base station. The UE may update the TCI state values configured to each CORESET to TCI={3,5}, which is the received TCI state value. That is, the UE may maintain the TCI state value configured to the CORESET 1 to the TCI state=3, and change the TCI state value configured to the CORESET 2 to TCI state=5.

The UE may receive third PDCCHs repeatedly transmitted using a beam corresponding to TCI state=3, which is the TCI state value configured to the CORESET 1, and a beam corresponding to TCI state=4, which is an updated TCI state value for the CORESET 2. If the PDCCHs schedule the PDSCH and include information indicating TCI={1}, DCI transmitted by the repeated PDCCHs includes only one TCI state value. Thus, the UE may assume that only PDCCH repetition occurs without PDSCH repetition. The UE may receive a PDSCH using the same beam (e.g., a beam corresponding to TCI state=3) as that of the PDCCH of any one (e.g., CORESET 1) of the CORESET 1 and the CORESET 2. Thereafter, the UE may transmit a PDCCH including an ACK for the received PDSCH to the base station and update the TCI state value configured to the CORESET 1 to TCI={1}, which is the received TCI state value.

Figure 17:
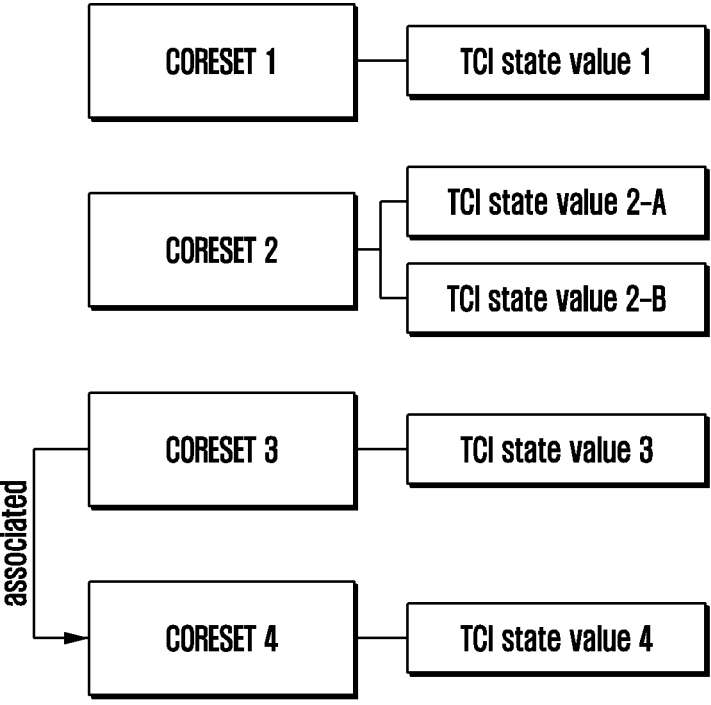
FIG. 17 illustrates a TCI state configuration for each CORESET according to an embodiment.

FIG. 17 illustrates a TCI state configuration for each CORESET according to an embodiment. More specifically, FIG. 17 illustrates an example of a TCI state configuration for each CORESET assuming that the above-described embodiments are combined.

Referring to FIG. 17, the UE may configure CORESETs 1 to 4 from the base station. In this case, it is assumed that only a TCI state 1 is configured to a CORESET and that a TCI state 2-A and a TCI state 2-B are configured to a CORESET 2. Further, it is assumed that repeated PDCCH transmission using a plurality of TRPs is supported and that a CORESET 3 is configured to a TCI state 3 and a CORESET 4 is configured to a TCI state 4 and that the CORESET 1 and the CORESET 2 are configured in association with each other. The UE may receive a PDCCH of the CORESET 1 using a beam corresponding to the TCI state 1. The UE may receive a PDSCH scheduled by a PDCCH of the CORESET 1 or transmit a PUSCH using a beam corresponding to the TCI state 1. Further, the UE may receive a PDCCH of the CORESET 2 using a beam corresponding to a TCT state 2-A, but may receive a PDSCH scheduled by the PDCCH of the CORESET 2 or transmit a PDSCH using a beam corresponding to the TCI state 2-B. Further, the UE may receive PDCCHs repeatedly transmitted through the CORESET 3 and the CORESET 4 configured to be associated with each other using a beam corresponding to the TCI state 3 and a beam corresponding to the TCI state 4. If DCI transmitted by the repeated PDCCHs includes only one TCI state value, the UE may assume that only PDCCH repetition occurs without PDSCH repetition. For example, the UE may receive repeatedly transmitted PDCCHs using beams corresponding to a TCI state of each CORESET and receive a PDSCH using a beam corresponding to the TCI state configured to any one CORESET among each CORESET. However, if DCI transmitted by the repeated PDCCHs includes two or more TCI state values, the UE may assume that PDSCH repetition occurs together with PDCCH repetition. For example, the UE may receive PDCCHs repeatedly transmitted using beams corresponding to the TCI state of each CORESET, and receive PDSCHs repeatedly transmitted using beams corresponding to the TCI state configured in each CORESET.

Although FIG. 17 illustrates an example in which a maximum of two TCI states are allocated for each CORESET, the number of TCI states allocated for each CORESET is not limited to a maximum two. For example, allocation of three or more TCI states is also possible. Further, as described above, it is also possible to change the number of TCI states allocated for each CORESET.

Figure 18:
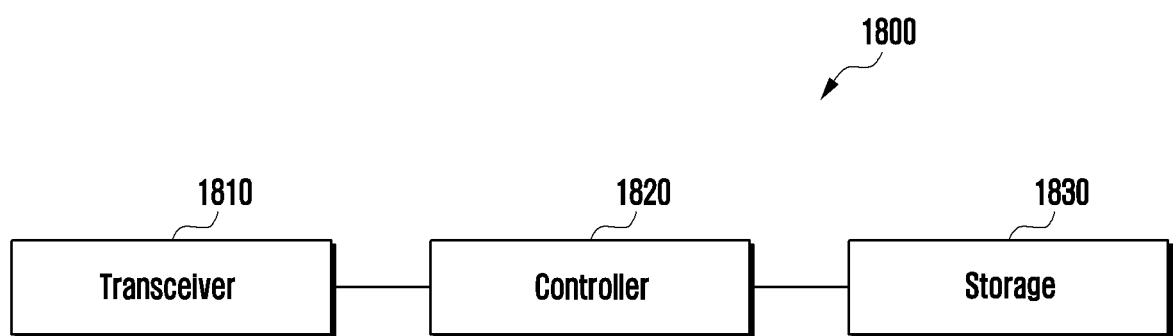
FIG. 18 illustrates a UE according to an embodiment.

FIG. 18 illustrates a UE according to an embodiment.

Referring to FIG. 18, a UE 1800 includes a transceiver 1810, a controller 1820, and a storage 1830. The controller 1820 may be defined as a circuit, an ASIC, or at least one processor.

The transceiver 1810 may transmit and receive signals to and from other network entities. For example, the transceiver 1810 may receive SI from the base station and receive an SS or an RS.

The controller 1820 may control the overall operation of the UE 1800 according to the above-described embodiments. For example, the controller 1820 may control the transceiver 1810 or the storage 1830 to perform an operation according to the above-described embodiments. Specifically, the controller 1820 may control the transceiver 1810 to transmit and receive configuration information, control information, or data according to and from the base station.

The storage 1830 may store at least one of information transmitted and received through the transceiver 1810 or information generated through the controller 1820.

Figure 19:
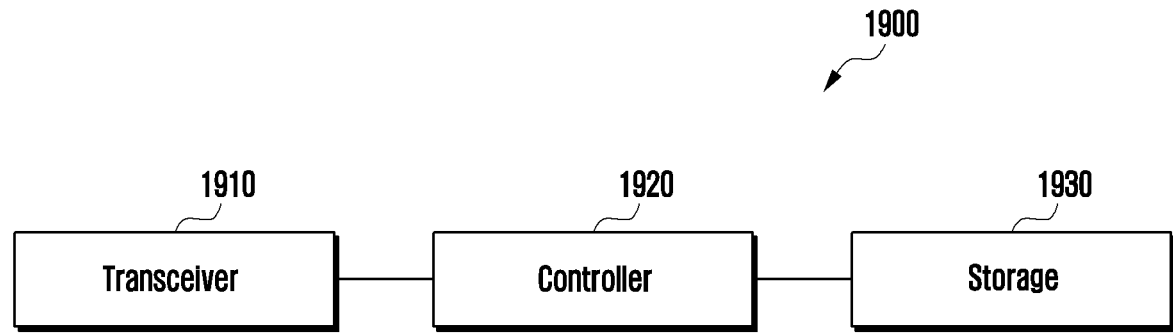
FIG. 19 illustrates a base station according to an embodiment.

FIG. 19 illustrates a base station according to an embodiment.

Referring to FIG. 19, the base station 1900 includes a transceiver 1910, a controller 1920, and a storage 1930. The controller 1920 may be defined as a circuit, an ASIC, or at least one processor.

The transceiver 1910 may transmit and receive signals to and from other network entities. For example, the transceiver 1910 may transmit SI to the UE and transmit an SS or an RS.

The controller 1920 may control overall operations of the base station 1900 according to the above-described embodiments. For example, the controller 1920 may control the transceiver 1910 or the storage 1930 to perform an operation according to the above-described embodiments. Specifically, the controller 1920 may control the transceiver 1910 to transmit and receive configuration information, control information, or data according to and from the UE.

The storage 1930 may store at least one of information transmitted and received through the transceiver 1910 or information generated through the controller 1920.

Embodiments of the disclosure disclosed in this specification and drawings merely present specific examples to easily describe the technical content of the disclosure and help the understanding of the disclosure, and are not intended to limit the scope of the disclosure. In addition to the embodiments disclosed herein, it is obvious to those skilled in the art to which the disclosure pertains that other modifications based on the technical spirit of the disclosure may be implemented. Further, each of the above embodiments may be operated in combination with each other, as needed.

According to an embodiment of the disclosure, a base station can configure two or more common beams to a terminal through an existing common beam-based beam control technique, and control communication between multiple TRPs and terminals through use and update of the beams.

Effects obtainable in the disclosure are not limited to the above-mentioned effects, and other effects not mentioned will be clearly understood by those of ordinary skill in the art to which the disclosure belongs from the description below.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a terminal in a wireless communication system, the method comprising:
  receiving, from a base station, first downlink control information (DCI) associated with a control resource set (CORESET), the first DCI indicating a plurality of transmission configuration indicator (TCI) states;
  updating the plurality of TCI states based on the first DCI;
  identifying that a first TCI state of the plurality of TCI states is for physical downlink control channel (PDCCH) reception;
  identifying that a subset of TCI states, excluding the first TCI state from the plurality of TCI states, is for physical downlink shared channel (PDSCH) reception;
  based on a determination that the subset of TCI states includes two or more TCI states, identifying that PDSCH repetition via different beams is configured:
  receiving, from the base station, a PDCCH using the first TCI state; and
  receiving, from the base station, repetitive PDSCHs using the subset of the TCI states.

2. The method of claim 1, further comprising:
  receiving, from the base station, second DCI associated with the CORESET, the second DCI indicating that a number of TCI states for PDSCH reception is updated to 1;
  based on the second DCI, identifying that the PDSCH repetition via different beams is released; and
  receiving, from the base station, a single PDSCH using a TCI state selected from the subset of the TCI states.

3. The method of claim 1, wherein the TCI state used for receiving the single PDSCH is selected based on a predefined rule.

4. The method of claim 2, wherein the TCI state used for receiving the single PDSCH is selected based on a configuration or indication received from the base station.

5. The method of claim 1, wherein the plurality of TCI states are updated after a beam application time from transmitting an acknowledgement (ACK) corresponding to the first DCI.

6. A method performed by a base station in a wireless communication system, the method comprising:
  determining to configure physical downlink shared channel (PDSCH) repetition via different beams to a terminal:
  determining a plurality of transmission configuration indicator (TCI) states, wherein a first TCI state of the plurality of TCI states is for physical downlink control channel (PDCCH) transmission, and wherein a subset of TCI states, including two or more TCI states and excluding the first TCI state from the plurality of TCI states, is for PDSCH transmission:

transmitting, to the terminal, first downlink control information (DCI) associated with a control resource set (CORESET), the first DCI indicating the plurality of TCI states;

transmitting, to the terminal, a PDCCH using the first TCI state; and transmitting, to the terminal, repetitive PDSCHs using the subset of the TCI states.

7. The method of claim 6, further comprising:

determining to release the PDSCH repetition via different beams;

transmitting, to the terminal, second DCI associated with the CORESET, the second DCI indicating that a number of TCI states for PDSCH reception is updated to 1; and transmitting, to the terminal, a single PDSCH using a TCI state selected from the subset of the TCI states.

8. The method of claim 7, wherein the TCI state used for transmitting the single PDSCH is selected based on a predefined rule.

9. The method of claim 7, wherein the TCI state used for transmitting the single PDSCH is selected according to a configuration or indication transmitted to the terminal.

10. The method of claim 6, wherein the plurality of TCI states are updated after a beam application time from receiving an acknowledgement (ACK) corresponding to the first DCI.

11. A terminal in a wireless communication system, the terminal comprising:

a transceiver; and a controller configured to:

receive, from a base station, via the transceiver, first downlink control information (DCI) associated with a control resource set (CORESET), the first DCI indicating a plurality of transmission configuration indicator (TCI) states, update the plurality of TCI states based on the first DCI, identify that a first TCI state of the plurality of TCI states is for physical downlink control channel (PDCCH) reception, identify that a subset of TCI states, excluding the first TCI state from the plurality of TCI states, is for physical downlink shared channel (PDSCH) reception, based on a determination that the subset of TCI states includes two or more TCI states, identify that PDSCH repetition via different beams is configured, receive, from the base station via the transceiver, a PDCCH using the first TCI state, and receive, from the base station via the transceiver, repetitive PDSCHs using the subset of the TCI states.

12. The terminal of claim 11, wherein the controller is further configured to:

receive, from the base station via the transceiver, second DCI associated with the CORESET, the second DCI indicating that a number of TCI states for PDSCH reception is updated to 1, based on the second DCI, identify that the PDSCH repetition via different beams is released, and receive, from the base station via the transceiver, a single PDSCH using a TCI state selected from the subset of the TCI states.

13. The terminal of claim 12, wherein the TCI state used for receiving the single PDSCH is selected based on a predefined rule.

14. The terminal of claim 12, wherein the TCI state used for receiving the single PDSCH is selected based on a configuration or indication received from the base station.

15. The terminal of claim 11, wherein the plurality of TCI states are updated after a beam application time from transmitting an acknowledgement (ACK) corresponding to the first DCI.

16. A base station in a wireless communication system, the base station comprising:

a transceiver; and a controller configured to:

determine to configure physical downlink shared channel (PDSCH) repetition via different beams to a terminal, determine a plurality of transmission configuration indicator (TCI) states, wherein a first TCI state of the plurality of TCI states is for physical downlink control channel PDCCH) transmission, and wherein a subset of TCI states, including two or more TCI states and excluding the first TCI state from the plurality of TCI states, is for PDSCH transmission, transmit, to the terminal, via the transceiver, first downlink control information (DCI) associated with a control resource set (CORESET), the first DCI indicating the plurality of TCI states wherein, transmit, to the terminal via the transceiver, a PDCCH using the first TCI state, and transmit, to the terminal via the transceiver, repetitive PDSCHs using the subset of the TCI states.

17. The base station of claim 16, wherein the controller is further configured to:

determine to release the PDSCH repetition via different beams, transmit, to the terminal, second DCI associated with the CORESET, the second DCI indicating that a number of TCI states for PDSCH reception is updated to 1, and transmit, to the terminal, a single PDSCH using a TCI state selected from the subset of the TCI states.

18. The base station of claim 17, wherein the TCI state used for transmitting the single PDSCH is selected based on a predefined rule.

19. The base station of claim 17, wherein the TCI state used for transmitting the single PDSCH is selected according to a configuration or indication transmitted to the terminal.

20. The base station of claim 16, wherein states the plurality of TCI states are updated after a beam application time from receiving an acknowledgement (ACK) corresponding to the first DCI.

* * * * *